(12) United States Patent
Rouvinez et al.

(10) Patent No.: US 7,698,196 B1
(45) Date of Patent: Apr. 13, 2010

(54) METHOD AND SYSTEM FOR MODELING AND BENCHMARKING PRIVATE EQUITY AND APPLICATIONS OF SAME

(75) Inventors: Christophe Rouvinez, Thalwil (CH); Thomas Kubr, Oberaegeri (CH)

(73) Assignee: Capital Dynamics, Zug (CH)

( * ) Notice: Subject to any disclaimer, the term of this patent is extended or adjusted under 35 U.S.C. 154(b) by 1643 days.

(21) Appl. No.: 10/843,834

(22) Filed: May 11, 2004

Related U.S. Application Data

(60) Provisional application No. 60/484,267, filed on Jun. 30, 2003.

(51) Int. Cl.
*G06Q 40/00* (2006.01)

(52) U.S. Cl. .................................... 705/36 R; 705/37

(58) Field of Classification Search .......... 705/36 R–37
See application file for complete search history.

*Primary Examiner*—Thu Thao Havan
(74) *Attorney, Agent, or Firm*—Baker Hostetler LLP

(57) ABSTRACT

Methods and systems are presented which permit more accurate analysis of the performance of private equity assets relative to the performance of a public index and also permit the simulation of private equity asset behavior during time periods for which reliable data for actual private equity performance is not available. The methods systems permit more accurate evaluation of a private equity asset relative to a benchmark, performance comparison of multiple private equity assets, the generation of scaled private equity data for use during simulation or other analysis under market conditions for which reliable private equity performance data is not available, risk analysis, rating and risk monitoring of private equity assets or structured products that invest in private equity assets, and as part of a private equity asset management and portfolio allocation tool.

17 Claims, 13 Drawing Sheets

Pooled cash flows for vintage year 1990 (dark bars) and
S&P500 total return index (solid line) for the period 1990 – 2002

Pooled cash flows for vintage year 1990 (black bars
and corresponding PME cash flows (gray bars)

Number of shares of index-tracking fund (gray shaded area), cumulative total private equity value (black line) and cumulative total index fund value (dark gray line)

Cash flow pattern for vintage year 1985 (black) and PME⁺ with 73.5% of private equity distributions (gray)

Number of shares of index-tracking fund for PME+ (gray shaded area), cumulative total private equity value (dark gray line) and cumulative total index fund value (light gray line)

Historical private equity NAV (black line), PME NAV (dashed gray line) and PME+ NAV (solid gray line) over benchmarking period. exposure Cash flow pattern for vintage year 1990 (black bars) and corresponding PME⁺ with λ = 83% (gray bars)

INDEX AND PRIVATE EQUITY DATA

| INDEX | | | | PRIVATE EQUITY | | | |
|---|---|---|---|---|---|---|---|
| PERIOD | RETURN | INDEX | 1/INDEX | DRAW | DIST | NAV | NET CF |
| 1 | 1% | 1.00 | 1.000000 | 25.0 | 0.0 | | -25.0 |
| 2 | 2% | 1.02 | 0.980392 | 25.0 | 2.0 | | -23.0 |
| 3 | 3% | 1.05 | 0.951837 | 25.0 | 10.0 | | -15.0 |
| 4 | 4% | 1.09 | 0.915228 | 25.0 | 40.0 | | 15.0 |
| 5 | 5% | 1.15 | 0.871646 | 0.0 | 50.0 | | 50.0 |
| 6 | 6% | 1.22 | 0.822307 | 0.0 | 10.0 | | 10.0 |
| 7 | 7% | 1.30 | 0.768511 | 0.0 | 10.0 | | 10.0 |
| 8 | 8% | 1.41 | 0.711585 | 0.0 | 10.0 | | 10.0 |
| 9 | 9% | 1.53 | 0.652830 | 0.0 | 10.0 | | 10.0 |
| 10 | 10% | 1.68 | 0.593482 | 0.0 | 10.0 | 10.0 | 20.0 |

IRR = 17.0%

FIG. 11A

PME

| PERIOD | NET CF | SHARES | NAV |
|---|---|---|---|
| 1 | -25.0 | 25.0 | 25.0 |
| 2 | -23.0 | 47.5 | 48.5 |
| 3 | -15.0 | 61.8 | 65.0 |
| 4 | 15.0 | 48.1 | 52.6 |
| 5 | 50.0 | 4.5 | 5.2 |
| 6 | 10.0 | -3.7 | -4.5 |
| 7 | 10.0 | -11.4 | -14.8 |
| 8 | 10.0 | -18.5 | -26.0 |
| 9 | 10.0 | -25.0 | -38.4 |
| 10 | -42.2 | -31.0 | -52.2 |

IRR = -0.3%

FIG. 11B
(Prior Art)

Scaled Cash Flow analysis

| PERIOD | NET CF | SHARES | NAV | S DIST |
|---|---|---|---|---|
| 1 | -25.0 | 25.0 | 25.0 | 0.0 |
| 2 | -23.6 | 48.1 | 49.1 | 1.4 |
| 3 | -17.9 | 65.2 | 68.5 | 7.1 |
| 4 | 3.4 | 62.1 | 67.8 | 28.4 |
| 5 | 35.5 | 31.1 | 35.7 | 35.5 |
| 6 | 7.1 | 25.3 | 30.7 | 7.1 |
| 7 | 7.1 | 19.8 | 25.8 | 7.1 |
| 8 | 7.1 | 14.8 | 20.8 | 7.1 |
| 9 | 7.1 | 10.1 | 15.5 | 7.1 |
| 10 | 17.1 | 5.9 | 10.0 | 7.1 |

Scaling Factor = 71.0%   IRR = 5.1%

FIG. 11C

| PERIOD | DATE | INDEX | 1/INDEX | DRAW | DIST | NAV | NET CF |
|---|---|---|---|---|---|---|---|
| 1 | 12/31/1955 | 3.83 | 0.261056 | 55.0 | 0.0 | | -55.0 |
| 2 | 12/31/1956 | 4.09 | 0.244749 | 25.0 | 2.0 | | -23.0 |
| 3 | 12/31/1957 | 4.31 | 0.231925 | 25.0 | 10.0 | | -15.0 |
| 4 | 12/31/1958 | 4.49 | 0.222516 | 25.0 | 40.0 | | 15.0 |
| 5 | 12/31/1959 | 4.52 | 0.221209 | 0.0 | 50.0 | | 50.0 |
| 6 | 12/31/1960 | 4.77 | 0.209863 | 0.0 | 10.0 | | 10.0 |
| 7 | 12/31/1961 | 4.77 | 0.209836 | 0.0 | 10.0 | | 10.0 |
| 8 | 12/31/1962 | 5.08 | 0.196721 | 0.0 | 10.0 | | 10.0 |
| 9 | 12/31/1963 | 5.34 | 0.187195 | 0.0 | 10.0 | | 10.0 |
| 10 | 12/31/1964 | 5.47 | 0.182917 | 0.0 | 10.0 | 45.0 | 55.0 |

Scaling Factor = 72.3%  IRR = 10.5%

FIG. 13A

DRAW

| FUND 1 | FUND 2 | FUND 3 | MARKET |
|---|---|---|---|
| 25.0 | 10.0 | 20.0 | 55.0 |
| 25.0 | 25.0 | 25.0 | 75.0 |
| 25.0 | 35.0 | 25.0 | 85.0 |
| 25.0 | 30.0 | 25.0 | 80.0 |
| 0.0 | 0.0 | 5.0 | 5.0 |
| 0.0 | 0.0 | 0.0 | 0.0 |
| 0.0 | 0.0 | 0.0 | 0.0 |
| 0.0 | 0.0 | 0.0 | 0.0 |
| 0.0 | 0.0 | 0.0 | 0.0 |
| 0.0 | 0.0 | 0.0 | 0.0 |

FIG. 12B

DIST

| FUND 1 | FUND 2 | FUND 3 | MARKET |
|---|---|---|---|
| 0.0 | 0.0 | 0.0 | 0.0 |
| 2.0 | 5.0 | 0.0 | 7.0 |
| 10.0 | 10.0 | 10.0 | 30.0 |
| 40.0 | 10.0 | 10.0 | 60.0 |
| 50.0 | 10.0 | 10.0 | 70.0 |
| 10.0 | 10.0 | 10.0 | 30.0 |
| 10.0 | 10.0 | 40.0 | 60.0 |
| 10.0 | 10.0 | 50.0 | 70.0 |
| 10.0 | 10.0 | 10.0 | 30.0 |
| 10.0 | 10.0 | 10.0 | 30.0 |

FIG. 12C

NAV

| FUND 1 | FUND 2 | FUND 3 | MARKET |
|---|---|---|---|
| 10.0 | 15.0 | 20.0 | 45.0 |

FIG. 12D

| YEAR | INDEX | YEAR | INDEX | YEAR | INDEX | YEAR | INDEX | YEAR | INDEX |
|---|---|---|---|---|---|---|---|---|---|
| 12/31/1920 | 1.00 | 12/31/1948 | 2.86 | 12/31/1976 | 11.23 | 12/31/2004 | 41.58 | 12/31/2032 | 183.11 |
| 12/31/1921 | 1.06 | 12/31/1949 | 2.93 | 12/31/1977 | 12.20 | 12/31/2005 | 42.68 | 12/31/2033 | 190.69 |
| 12/31/1922 | 1.12 | 12/31/1950 | 3.15 | 12/31/1978 | 13.00 | 12/31/2006 | 46.25 | 12/31/2034 | 204.44 |
| 12/31/1923 | 1.18 | 12/31/1951 | 3.18 | 12/31/1979 | 13.14 | 12/31/2007 | 46.49 | 12/31/2035 | 221.29 |
| 12/31/1924 | 1.26 | 12/31/1952 | 3.41 | 12/31/1980 | 13.43 | 12/31/2008 | 49.18 | 12/31/2036 | 224.96 |
| 12/31/1925 | 1.31 | 12/31/1953 | 3.55 | 12/31/1981 | 14.51 | 12/31/2009 | 49.83 | 12/31/2037 | 226.39 |
| 12/31/1926 | 1.34 | 12/31/1954 | 3.67 | 12/31/1982 | 15.27 | 12/31/2010 | 54.63 | 12/31/2038 | 241.98 |
| 12/31/1927 | 1.42 | 12/31/1955 | 3.83 | 12/31/1983 | 15.77 | 12/31/2011 | 59.41 | 12/31/2039 | 259.47 |
| 12/31/1928 | 1.46 | 12/31/1956 | 4.09 | 12/31/1984 | 16.94 | 12/31/2012 | 64.70 | 12/31/2040 | 277.21 |
| 12/31/1929 | 1.58 | 12/31/1957 | 4.31 | 12/31/1985 | 17.51 | 12/31/2013 | 70.96 | 12/31/2041 | 292.35 |
| 12/31/1930 | 1.72 | 12/31/1958 | 4.49 | 12/31/1986 | 17.60 | 12/31/2014 | 76.56 | 12/31/2042 | 302.18 |
| 12/31/1931 | 1.73 | 12/31/1959 | 4.52 | 12/31/1987 | 18.38 | 12/31/2015 | 82.84 | 12/31/2043 | 314.71 |
| 12/31/1932 | 1.78 | 12/31/1960 | 4.77 | 12/31/1988 | 19.63 | 12/31/2016 | 84.96 | 12/31/2044 | 331.29 |
| 12/31/1933 | 1.79 | 12/31/1961 | 4.77 | 12/31/1989 | 21.51 | 12/31/2017 | 85.87 | 12/31/2045 | 362.13 |
| 12/31/1934 | 1.82 | 12/31/1962 | 5.08 | 12/31/1990 | 22.44 | 12/31/2018 | 91.34 | 12/31/2046 | 375.74 |
| 12/31/1935 | 1.87 | 12/31/1963 | 5.34 | 12/31/1991 | 23.57 | 12/31/2019 | 92.59 | 12/31/2047 | 404.50 |
| 12/31/1936 | 1.99 | 12/31/1964 | 5.47 | 12/31/1992 | 23.89 | 12/31/2020 | 94.52 | 12/31/2048 | 422.08 |
| 12/31/1937 | 2.03 | 12/31/1965 | 5.89 | 12/31/1993 | 24.14 | 12/31/2021 | 100.40 | 12/31/2049 | 454.79 |
| 12/31/1938 | 2.08 | 12/31/1966 | 6.33 | 12/31/1994 | 24.39 | 12/31/2022 | 106.07 | 12/31/2050 | 460.65 |
| 12/31/1939 | 2.16 | 12/31/1967 | 6.46 | 12/31/1995 | 25.83 | 12/31/2023 | 115.42 | 12/31/2051 | 489.95 |
| 12/31/1940 | 2.17 | 12/31/1968 | 7.09 | 12/31/1996 | 28.36 | 12/31/2024 | 124.10 | 12/31/2052 | 522.08 |
| 12/31/1941 | 2.38 | 12/31/1969 | 7.24 | 12/31/1997 | 30.74 | 12/31/2025 | 130.24 | 12/31/2053 | 552.32 |
| 12/31/1942 | 2.58 | 12/31/1970 | 7.47 | 12/31/1998 | 31.41 | 12/31/2026 | 134.03 | 12/31/2054 | 572.71 |
| 12/31/1943 | 2.58 | 12/31/1971 | 7.85 | 12/31/1999 | 32.02 | 12/31/2027 | 139.07 | | |
| 12/31/1944 | 2.66 | 12/31/1972 | 8.57 | 12/31/2000 | 34.18 | 12/31/2028 | 146.12 | | |
| 12/31/1945 | 2.68 | 12/31/1973 | 8.98 | 12/31/2001 | 36.25 | 12/31/2029 | 158.52 | | |
| 12/31/1946 | 2.69 | 12/31/1974 | 9.84 | 12/31/2002 | 37.86 | 12/31/2030 | 166.13 | | |
| 12/31/1947 | 2.83 | 12/31/1975 | 10.47 | 12/31/2003 | 40.75 | 12/31/2031 | 172.25 | | |

FIG. 12A

| INDEX | PRIVATE EQUITY (SIMULATED) | | | |
|---|---|---|---|---|
| PERIOD | DRAW | DIST | NAV | NET CF |
| 1 | 25.0 | 0.0 | | -25.0 |
| 2 | 25.0 | 1.4 | | -23.6 |
| 3 | 25.0 | 7.2 | | -17.8 |
| 4 | 25.0 | 28.9 | | 3.9 |
| 5 | 0.0 | 36.2 | | 36.2 |
| 6 | 0.0 | 7.2 | | 7.2 |
| 7 | 0.0 | 7.2 | | 7.2 |
| 8 | 0.0 | 7.2 | | 7.2 |
| 9 | 0.0 | 7.2 | | 7.2 |
| 10 | 0.0 | 7.2 | 10.0 | 17.2 |

IRR = 5.6%

FIG. 13B

METHOD AND SYSTEM FOR MODELING AND BENCHMARKING PRIVATE EQUITY AND APPLICATIONS OF SAME

CROSS REFERENCE TO RELATED APPLICATIONS

This application claims priority under 35 U.S.C. Sec. 119 from U.S. Provisional Application No. 60/484,267 entitled "Method and System for Modeling and Benchmarking Private Equity and Applications of Same," filed Jun. 30, 2003.

FIELD OF THE INVENTION

The present invention is related to portfolio analysis and, more specifically, to a method and system for modeling and benchmarking the performance of an asset that has an irregular cash flow, such as a private equity asset or liability.

BACKGROUND

There is a need to benchmark the performance of private equities and other assets and liabilities that have irregular cash flows and also to determine how such an asset or liability would perform under various market scenarios for which actual performance data for the private equity is not available.

A private equity investment has an irregular cash flow. This cash flow comprises draw downs, in which funds are invested into the asset, and disbursements, in which funds are returned to the investor. Cash flow events can occur with long intervening intervals. For example, when there is a slow investment and divestment pace, events may be reported on a quarterly basis, in quarters where investment or divestment events occur. However, as will be appreciated, different private equities operate on different schedules.

There is a desire and need to benchmark the performance of private equity. However, a direct comparison between a private equity and other types of asset classes is difficult. This is because private equity performance is best measured in terms of internal rate of return ("IRR"), due at least in part because of the irregular cash flows, whereas traditional asset classes, such as exchange traded securities, are characterized by time-weighted returns ("TWR").

A time weighted return provides a measure of the compounded rate of growth of a portfolio's market value during the evaluation period. In contrast, an internal rate of return represents the interest rate at which the net present value the investment, including all cash flows during the evaluation period, equals zero. Because IRR makes use of a present-value evaluation, the value of the IRR is effected by the amount and timing of the irregular cash flow. (For public equity investments, having only one cash inflow and one outflow, the TWR and IRR are the same.)

TWR does not yield useful results for situations with multiple and varying cash in- and outflows. While IRR of private equity normally yields useful absolute performance results, the results cannot be directly compared to the performance of public equities for the same time period, since the level of investments varies for private equities, but not for public equities. For example, the period between 1999 and 2001 was characterized by large run-ups of most equity indexes, followed by a precipitous decline. As can be appreciated, this situation will result in widely different performance comparison depending on the timing of investments and the level of invested funds.

A partial solution to the problem of comparing public and private equity data is provided with a conventional technique known as PME, short for Public Market Equivalent. (PME is also sometimes referred to as ICM or Index Comparison Method.) PME is an index return measure which is adjusted to reflect the irregular timing of cash flows actually experienced with a private equity. A PME corresponds to the dollar-weighted return that would have been achieved by investing in a benchmark public market asset, such as a fund valued on the S&P 500 index, at the same time as when the private equity asset is receiving investment funds and by selling index-shares whenever the private equity asset has a disbursement back to investors.

To determine PME, the cash flows in and out of the private equity asset are applied to an index-based investment at the same time and in the same amounts. Cash inputs to the private equity asset equate to investments in the benchmark asset. Disbursements from the private equity asset equate to sales of the benchmark asset. The IRR for the public fund is then determined based on the total returns for the hypothetical public fund investments at the end of the time period of interest. This value is the public market equivalent IRR for the private equity.

The difference between the PME return of the investment in the benchmark and the IRR for the private equity can be used to compare the performance of the two during the time period for which there is data for the private equity to determine whether or not the private equity outperformed the benchmark. If the PME return is greater than the private equity IRR, the public market, as represented by the benchmark, shows a higher performance. If there is a negative balance, the public market shows a lower performance. PME is described in more detail in various documents, including "*A Private Investment Benchmark*," by A. Long, III and C. Nickels, AIMR Conference on Venture Capital Investing, Feb. 13, 1996, and Chapter IX of "2000 *Investment Benchmark Report*", published by Venture Economics, 2000.

PME has the advantage that it is simple to apply and provides a way to directly compare the performance of a private equity fund with the performance of a public index. However, while PME has received a good deal of academic publicity and has been used to a limited extent, PME has several drawbacks. As a result, it has not been widely embraced by the financial industry as a day-to-day measure, particularly in the context of rating and modeling prospective private equity offerings.

One drawback is that when the private equity fund is not liquidated and the net asset value ("NAV") is different from zero at the end of the time interval, PME still has some dependency on the NAV. In such circumstances, using PME as a benchmark actually reduces to simply comparing the end balance of the index-tracking fund to the NAV of the private equity fund, setting a lot of emphasis on the latter number and relying indirectly on the assumption that the private equity investor can immediately exit the fund at that value. This assumption is questionable given the basic lack of liquidity of private equity.

A more significant issue is that PME does not always accurately reflect real-world results. For example, when a private equity investment outperforms the public index on which the benchmark is based, the resulting hypothetical investment in the index tracking fund is likely to be negative. To achieve this result, the hypothetical investor in the benchmark would need to sell all of the investment shares and then short additional shares to make up the difference. At a minimum, this can skew a benchmarking process based on the PME and result in errors in a correlation analysis. In a worst case, depending on the cash flow pattern, the negative balance can make it impossible to determine a discount rate that would bring the net present value of the benchmark investment to zero such that the IRR for the public fund would be undefined.

For example, FIG. 1A shows pooled cash flows for vintage year 1990 (dark bars) and S&P500 total return index (solid line) for the period 1990-2002. FIG. 1B shows pooled cash flows for vintage year 1990 (black bars) and the corresponding PME cash flows (gray bars). The reported private equity NAV the end of 2002 is $937 million, whereas the corresponding index-tracking fund balance amounts to $−1,545 million. The final NAV of the index-tracking fund is deeply negative, pointing at the short exposure in the index. Despite the large negative final cash flow, IRR can be computed and yields 19.3%, which on compares well with the 21.5% achieved with the private equity portfolio.

FIG. 2 shows the development over time of the numbers of index shares the benchmark portfolio as determined by PME of vintage 1985. The number of shares is negative from 1993 onwards. Over that period, the exposure of an investor in the benchmark portfolio is equivalent to running a short position in the index. The evolution of the cumulative total value (sum of all distributions and current net asset value) indicates how the exceptional performance of the late 1990's is actually working against the benchmark portfolio. The market decline in 2000 and 2001 then results in huge gains. This shift from a long to a short position spoils the benchmarking process, resulting in non-sensible situations. A further direct consequence of the short position is that a correlation analysis based on PME can give misleading results.

Based on a benchmarking analysis of several hundred private equity funds, the applicants have found that more than 20% of the funds in the private equity database generated short index exposure through the life of the investments and about 5% yielded cash flow patterns with undefined IRR. As a result, PME calculations, while useful for certain limited cases, can be unreliable in many situations, giving either incorrect results or being impossible to calculate. This makes it difficult to use PME as a consistent and long term measurement for private equity and other assets or liabilities with irregular cash flows.

It is an object of the invention to provide a method of comparing the performance of public and private equities and, more generally, for comparing any two asset classes where at least one has irregular cash flows or irregular performance, and which method avoids the problems associated with PME.

A further object of the invention is to provide an improved method for comparing the performance of different private equity assets.

In addition to benchmarking a current performance of a private equity asset for which data exists, there is also a need to determine the performance of a private equity asset, liability, or other asset having an irregular cash flow, relative to an index or other benchmark value under market conditions that differ from the conditions for which private equity data is available. Such an analysis can be used, for example, in trying to determine how well a given private equity asset would have performed at different periods in history. It can also be used to determine performance the private asset under various circumstances using a simulation process that varies a performance index so as to determine a probable range of behaviors for the asset. Unlike public equities, which have a long and detailed historic record, the record of private equity performance is more limited, spanning on the order of 20 years or so. As a result, there is little or no real private equity data under many different types of market conditions. Without real performance data, there is no direct measure under such market conditions that can be used to determine private equity performance during other time periods. Conventional practice has been to simply assume that private equity is correlated to public equity and so would have the same return as the benchmark. However, benchmarks typically represent the average performance of a large number of components while the particular private equity asset under consideration draws from a much smaller pool. Even if an overall average of private equity assets has a performance that closely tracks the index, half of the individual private equity assets would be expected to outperform the index and half to under perform the index. Thus, the usefulness of this conventional technique is limited to providing support for general statements about the asset class as a whole and does not provide insights on particular sub-sets.

What has been absent from conventional analysis is a technique to allow the use of a private equity data set that is valid for a first time period relative to a benchmark as the source for a derived data set for use in analyzing performance against the (historical or generated) benchmark over a second time period for which good private equity data is lacking. This would permit the accurate use of sophisticated data analysis techniques and tools, such as Monte-Carlo and historic simulation systems. These simulation systems have been developed for use in analyzing and predicting the behavior and comparative risk of investments in public equities or other more traditional assets for which there is a much longer set of market data for a much greater number of entities and for which performance data, such as pricing, is available on a comparatively continuous basis during that time span.

One known technique for risk analysis of private equity is disclosed in Published U.S. Patent Application 2003/0028463A1, entitled "Process and System for Determining Correlation of Public and Private Markets and Risk of Private Markets," dated Feb. 6, 2003. This application discloses determining a risk associated with private equity investments by performing a correlation analysis between the IRR of the private equity and a corresponding IRR calculated using conventional PME as applied to a public market index. The coefficient of correlation between the IRR of the private equity and that from PME is then used to determine a value for risk vs. return of investment in the private equity relative to that of investing in the public market.

There are several drawbacks to this approach. The disclosed method is inaccurate because it relies on PME, which gives flawed results under a number of circumstances. For example, the disclosed method does not properly address situations where the PME may produce a negative IRR under circumstances where analysis of the benchmark index would give the expectation of positive results. Also, even if only the difference between the IRR for the private equity and from PME is considered, there may still be situations where the IRR in a PME analysis is undefined so that the disclosed technique breaks down. In addition, the application does not address issues raised by the absence of private equity data in time periods before the 1980s. Instead, the disclosed technique uses the same correlation analysis based on the available private equity data regardless of the time period from which the public market data is drawn for the PME calculations. Although a mathematical value can be determined through this analysis, it does not account for the fact that the private equity behavior would likely be different under different market conditions. Thus, for example, while the disclosed correlation analysis can provide an indication of the risk of investing in a private equity today relative to the risk of investing in the S&P in 1940s, the usefulness of this value is questionable. The real issue is to determine a comparative risk of investments made at the same time under the same market conditions. This is not addressed in the application referenced herein and, indeed, the application indicates that other than the disclosed correlation analysis, there was no way known to the named inventors, who are also early developers of PME, to evaluate the comparative risk of a private investment portfolio.

U.S. Patent Application Publication 2003/0061169A1, dated Mar. 27, 2003, discloses a method and system for evaluating the performance attribution of a private investment portfolio. The disclosed technique relies on converting the portfolio, which may contain investments of different amounts in different private equities, into a neutral-weight portfolio. This is done by scaling the cash-flows of all investments in the portfolio, in their entirety, to a common constant so that the contributions of each investment to the portfolio are equally weighted. Because the relative weights of each component in the portfolio are equal, certain types of portfolio management calculations are simplified. However, this reference is entirely unconcerned with the problem of providing private equity data suitable for use in analysis relative to an index during a period in which actual private equity data is unavailable.

It is a further object of the invention to provide a method of scaling private equity cash flows and performance so that a performance attribute of the scaled cash flows has a specified relationship to an observed index or benchmark or a simulated index or benchmark and where the scaling allows application of existing private equity data to analysis and simulation of the private equities for periods where actual data is not available.

Another object of the invention to provide a method of scaling private equity cash flows and performance to match a given performance for use in historical, Monte-Carlo, and/or other types of simulation.

A further object of the invention to provide a method of determining various sets of cash flows, performance or scenarios achieving a determined return for use in generated future performance simulation (prescribed or randomly generated).

Yet another object of the invention is to provide a method of scaling private equity cash flows and performance for use as part of a rating analysis of a structured product.

Yet a further object of the invention is to provide a method of scaling private equity cash flows and performance for use as part of a rating analysis of a debt product based on assets/liabilities of alternative assets.

Still another object of the invention is to provide a method of scaling private equity cash flows and performance for risk modeling, control and management of such assets/liabilities.

Still a further object of the invention is to provide a method of scaling private equity cash flows and performance for portfolio management of such assets/liabilities, whether by themselves or as part of a larger portfolio of assets/liabilities containing other assets.

SUMMARY OF THE INVENTION

These and other objects are achieved by scaling the cash flows of a private equity asset (or other investment or liability, such as a hedge fund) or scaling a corresponding cash flow applied to a benchmarking index, in a way that addresses the deficiencies of the conventional PME process. In particular, a cash flow scaling factor or function is selected so that when applied to a portion of the cash flow, such as only disbursements, a performance attribute of the private equity asset, such as a final value, and the corresponding attribute of a hypothetical investment in a fund valued on the benchmark have a determined relationship at the end of the period at interest. For example, the scaling factor can be selected so that, when used to scale the value of disbursements as applied to the benchmark investment, the end balance in the public equity portfolio valuation matches the end value of the private equity, as measured, e.g., by its NAV. Alternatively, the scaling factor could be selected so that the final value of the private equity asset exceeds or is less than the public market benchmark by a selected percentage, representing a premium or discount.

In a first implementation, scaling is applied only to disbursements in the cash flow and the scaling factor is constant to ensure that the overall cash flow pattern is preserved. This has the advantage of being relatively simple to implement. Alternatively, or in conjunction, scaling can also be applied to draw downs, where the scaling factor could in effect represent a liquidity premium. Other and more complex scaling factors, functions and models can also be used and applied to either or both cash flow components (i.e., disbursements and/or draw downs). For example different scaling factors can be used for different time periods, determined using a mathematical function (linear, exponential, or any other), derived from a set of market data (public equity, bonds, treasuries, interest rates, exchange rates, trading volume, etc.), set to provide a level of stress or providing a multi-dimensional set of descriptive parameters, or various combinations of the above. Similarly, a first scaling factor or function could be applied to disbursements and a second scaling factor or function applied to draw downs (capital calls).

Advantageously, the determined scaling factor can be used to provide a direct indication of the performance of the private equity asset relative to the benchmark or to another private equity fund. In addition, this technique avoids the problem of undefined IRR values during a benchmarking analysis that can be present in a conventional PME analysis (or, in the case of non-linear scaling, reduces the likelihood that this will be a problem.

A similar technique can also be used to scale available private equity performance information to generate scaled cash flow data suitable for use in an analysis relative to a benchmark in a period during which corresponding private equity data is not available. For example, a scaling factor for pooled private equity data from 1985-2000 can be chosen for use in an analysis relative to benchmark data from 1930-1945. Scaling preserves the general cash flow of the modern data while ensuring that the general performance has a selected relationship relative to the historic data. A set of scaled equity data can then be generated for use as needed.

In one application, the set of scaled equity data comprises scaled cash flow data for a large number of private equity assets. Subsets of the pooled data can then be selected, with the data varied at random to introduce fluctuations, for example, so as to simulate private equity performance during a historic time period of interest. An analogous method can be used in Monte-Carlo or other simulations which use a generated benchmark index.

Advantageously, the ability to accurately simulate the behavior of a private equity under market conditions for which real private equity data is unavailable allows various risk profiles to be developed by statistically analyzing large numbers of simulation runs from, e.g., a Monte-Carlo simulator. In a particular application, the projected behavior of a private equity is analyzed to determine the likelihood that the asset, or a structured product invested in the asset, will be unable to meet its payment obligations within a specified period of time. This risk of default can then be used to provide a rating indicating the risk of investment into that private equity asset. Other risk and performance analysis can be used to assist a manager of a private equity fund or management of a portfolio containing such assets/liabilities.

BRIEF DESCRIPTION OF THE DRAWINGS

The various aspects of the invention, as explained in the detailed description, will be more completely understood with reference to the following figures, in which:

FIGS. 11A-11C show tables of sample index and private equity data with a comparison of a conventional PME analysis and a scaled cash flow analysis according to an aspect of the invention;

FIGS. 12A-D are tables sample index and private equity fund data for use in simulation;

FIGS. 13A-B are tables showing private equity cash flow scaling factor and a sample simulation of private equity behavior.

DETAILED DESCRIPTION OF THE PREFERRED EMBODIMENTS

Figure 1A:
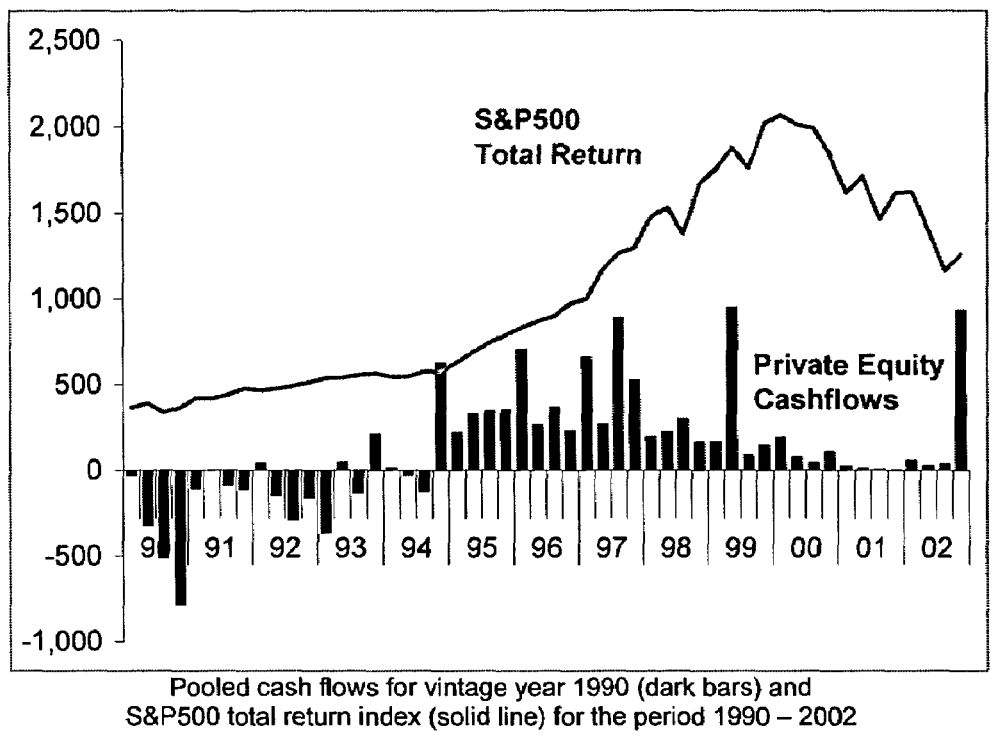
FIG. 1A is a graph of pooled cash flows for vintage year 1990 and S&P500 total return index for the period 1990-2002.
Figure 1B:
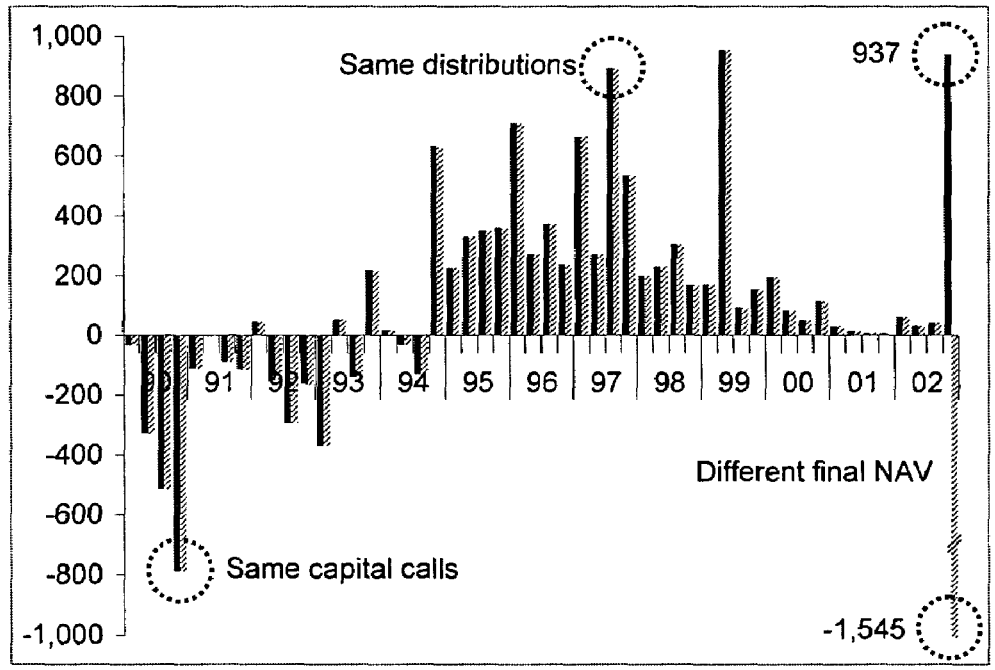
FIG. 1B is a graph of shows pooled cash flows for vintage year 1990 and the corresponding PME cash flows.
Figure 2:
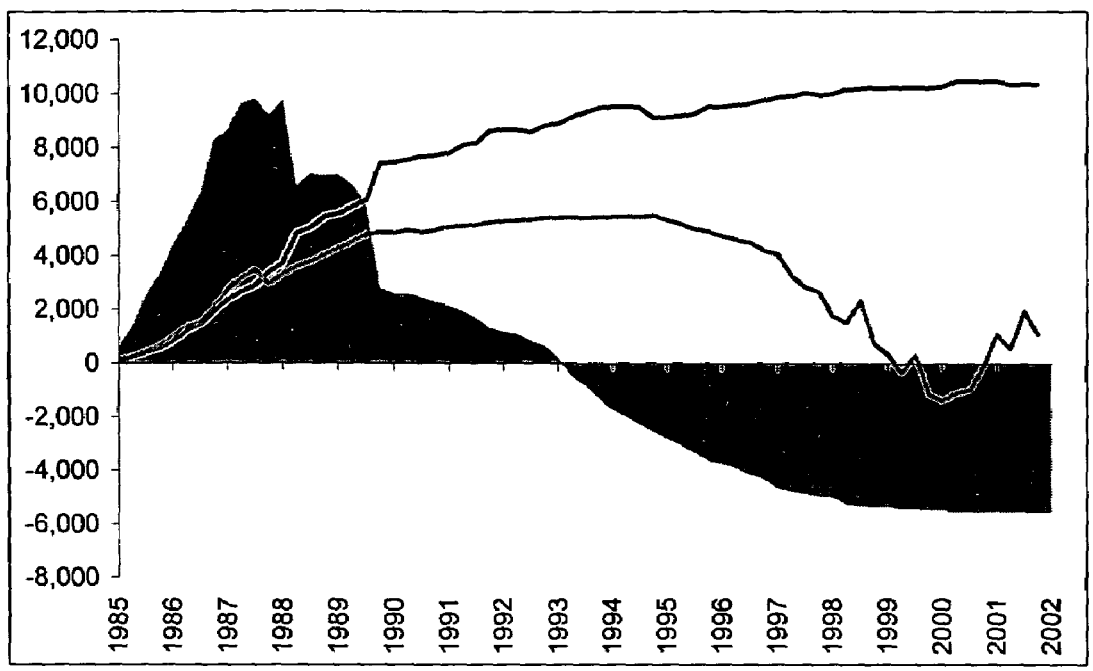
FIG. 2 is a graph showing the numbers of index shares as function of time for the public market equivalent vintage 1985.

The present invention provides a method of scaling the performance data from a financial instrument, such as the cash flow data from a private equity asset, to provide for benchmarking against a public market or other index, and to provide data that can be used in historical and random simulation processes. The discussion of various aspects of the invention will be largely in terms of the performance of private equity. However, the present invention can also be applied to benchmarking and analysis processes for a wide variety of asset classes that have irregular cash flows. Unless specifically stated, general references to a private equity asset in the context of explaining the invention should be considered equally as applying to these other asset types or the corresponding liabilities. Such other assets include investments in a single private company, a fund of company investments, a fund of funds of private equity, hedge funds and fund of funds thereof, insurance liabilities and claims, natural resources, energy investments, derivatives based on any of these assets, and various others as will be appreciated by those of skill in the art.

Private equity cash flow data suitable for use in accordance with the various aspects of the invention can be obtained from a number of sources, such as Venture Economics, Bloomberg, or proprietary data. Generally, data is provided that contains, for a large number of private equity assets, the cash flow events (draw downs and distributions), the date of a cash flow event, and a measure of the NAV. Such events can occur at any time but are typically reported on a periodic basis, such as quarterly or monthly. In addition to basic cash flow data, various attributes characterizing the asset in the database are provided. These can include one or more of the vintage year of the private equity asset (e.g., the year when the first event occurred), the characteristic of the investment (such as venture, buyout, distressed, or mezzanine), the size, industry, geography, or currency of the investment, as well as various other attributes. Conventional database tools are available to allow a full set of private equity data to be filtered so that cash flows for private equity assets having specific attributes can be selected.

In a benchmarking analysis, actual performance data for the private equity asset and the corresponding benchmark index are typically available and the issue to be addressed is the performance of the private equity relative to the index. According to a first aspect of the invention, private equity cash flow data is compared to a benchmark index by applying the cash flow to a hypothetical investment in a fund valued on the benchmark. A scaling factor or function is then applied to the cash flow data so that an attribute of the private equity asset and a corresponding attribute of the benchmark investment have a selected relationship at the end of the period at interest. Preferably, the performance value used is the final NAV or the IRR of the private equity asset and the corresponding investment in a benchmark index fund. Alternatively, however, the determined relationship provided by the scaling factor can be based on other characteristics. A non-limiting set of quantitative measures includes the following: (a) a measure of performance, such as the cash multiple, which describes the ratio of cash returned to the investor relative to cash drawn; (b) a measure of speed of investment or divestment, such as the average investment or divestment time; and (c) a measure of the exposure to the asset class, such as the average exposure over time. (NAV at the end of the period, discussed above, is a subset of this category as it ensures that exposure going forward is the same for both the investment in private equity and the investment in the index.)

In one embodiment of the invention, the magnitude of the cash distributions from the private equity as applied to the benchmark investment are scaled according to a scaling factor before the performance of the benchmark, measured using IRR, is determined. Preferably, the scaling factor is selected so that the final value of the private equity asset and the value of the benchmark investment have a specified relationship at the end of the period at interest. For example, the scaling factor can be selected so that the end balance in the benchmark portfolio valuation matches the end value of the private equity asset, as measured, e.g., by its NAV. Therefore, if the final value of the private equity is zero, the scaling factor should be selected so that the disbursements from the benchmark investment give it a final value of zero as well. In an alternative embodiment, scaling is performed so that the public equity portfolio valuation matches the end value of the private equity as measured by a discounted NAV, where the discount factor might be chosen arbitrarily, set equal to the expected discount on the secondary market, or simply set to zero to be conservative.

The magnitude of the scaling factor provides a measurement of the over- or under-performance of the private equity asset relative to the benchmark. In addition, by comparing the determined scaling factors for different private equity assets, their relative performances can be determined. In addition, and unlike in a conventional PME analysis, by appropriate selection of a scaling factor, the benchmark equivalent IRR will be well defined for all cash flow patterns.

Figure 3:
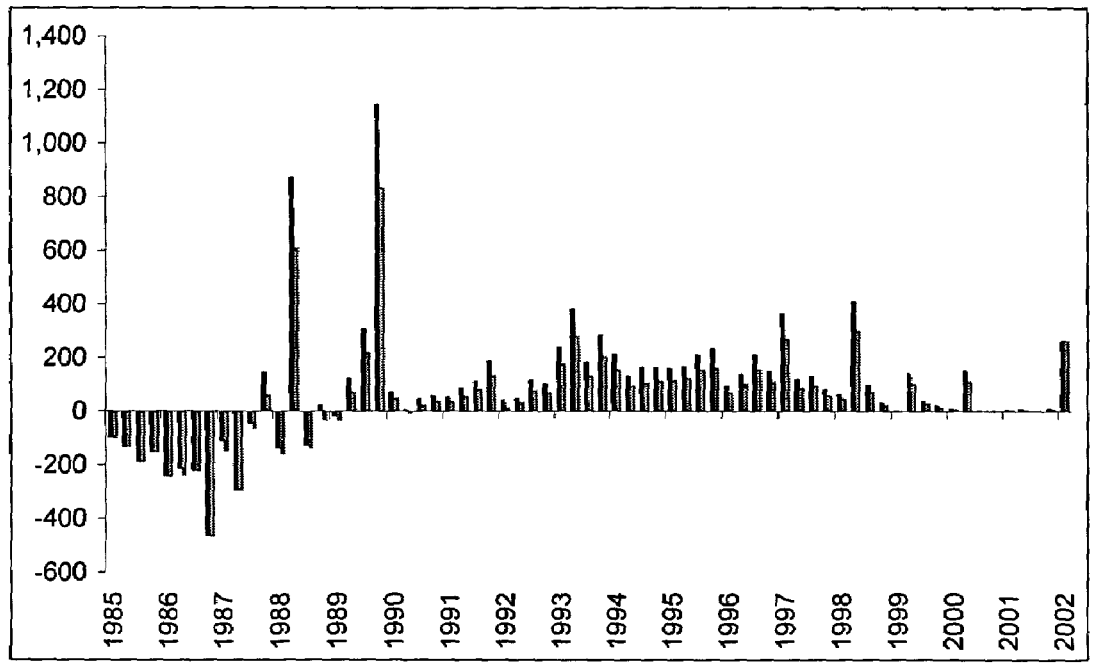
FIG. 3 is a graph of the cash flow pattern for a large number of funds for vintage year 1985 where divestments from the index-tracking benchmark fund have been scaled to be 73.5% of the private equity distributions.

FIG. 3 shows a cash flow pattern for a large group of US private equity assets of vintage year 1985 (black) through 2002. The cash flow has been applied to an index-tracking benchmark fund, in this case the S&P500 total return index. The net cash flow of the benchmark is shown in gray. Divestments as applied to the index fund have been scaled to be 73.5% of the private equity distributions. This value was selected to provide an end balance of the benchmark investment that matches the private equity NAV. The corresponding IRR amounts to 14.6% and is representative of the performance of US public equity markets for that period.

Figure 4A:
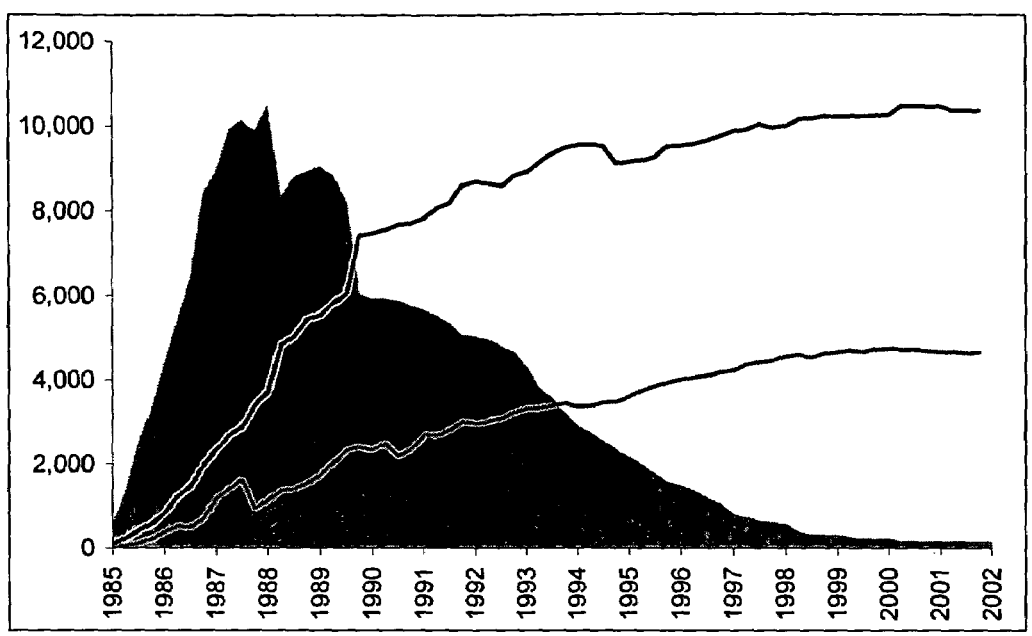
FIG. 4A is a graph showing the running number of index tracking fund shares for the cash flow pattern of FIG. 3.

As shown, the scaling process yields a similar cash flow pattern to the private equity cash flow. While the cash flows are similar to the non-scaled cash flows during the early stages due to the non-scaled draw-downs, they are all reduced proportionally towards the end when only the effect of the scaling on the disbursements from the benchmark investment is left. The scaled cash flow computation disclosed herein helps to preserve the long (or positive) exposure to the benchmark asset class. Scaling tends to preserve the sign of the exposure and can ensure a positive end balance. For example, FIG. 4A shows the running number of index tracking fund shares, which remains positive over the entire period.

Figure 4B:
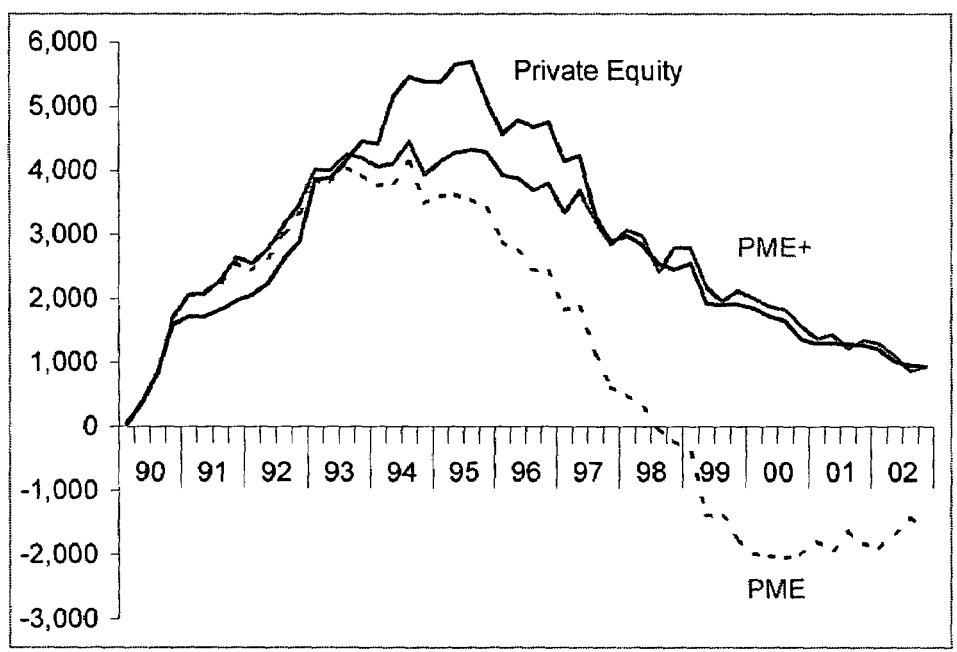
FIG. 4B is a graph showing historical private equity NAV, PME NAV and PME+ NAV over a benchmarking period.

While this process does not guarantee that the exposure stays positive over the entire investment period, it does for the large majority of scenarios and the IRR calculated according to the invention (sometimes referred to herein as PME+) much better tracks the performance of private equity than does PME. For example, FIG. 4B is a graph showing historical private equity NAV, PME NAV and PME+ NAV over a benchmarking period. As shown, the PME NAV becomes negative as early as mid 1998 until the end of the period whereas PME+ NAV follows a similar profile to the private equity NAV, ensuring a comparable level of exposure over the entire period. An analysis by the applicants of a large number of private equity assets using a sample private equity database indicated that only 0.5% of the private equity assets benchmarked according to the present invention showed more than one quarter with negative exposure. In practical terms, the few cases where the benchmark is shorted are only of academic interest. Moreover, IRR was always well defined for all cash flow patterns.

Advantageously, the present invention provides a reliable framework for the comparison of private equity returns with returns of other asset classes and enables the computation of the correlation between long-term public and private equity returns. While the cash flow patterns for the private equity and the comparison do not match exactly, this is mitigated by the fact that at least for timing, in flows and a fixed proportion of out flows are the same. Further, these differences (as expressed by the scaling function) may be used to interpret differences between assets classes, such as a liquidity premium, out-performance or different beta. This feature can be further exploited to create more complex and scaling functions to introduce various descriptive datasets or functions.

Although specific examples discussed herein scale only the disbursements, it can be advantageous in certain circumstances to scale the cash in-flows as well as, or instead of, the disbursements. Since the overall performance of the private equity or benchmark in question is based on the amount of the disbursement relative to the investment, scaling of either or both of these factors can be used to adjust the performance of, in this case, the benchmark asset, so that its performance matches that of the private equity. For example, increasing the disbursements for a fixed cash input will increase relative performance. Analogously, keeping the disbursements constant and decreasing the draw downs in the cash flow will also increase relative performance. Scaling both at the same time can increase or decrease the magnitude of the scaling effects depending on the scaling functions applied. Preferably, when both disbursements and in-flows are scaled, the scaling is asymmetric wherein different functions are used to scale each component. As will be appreciated, when linear scaling is used, the scaling factor applied to the disbursements should not be the same as that applied to the draw downs. Otherwise, the effect will simply be to reduce the overall investment in the private equity without changing the proportional magnitudes of the performance attributes. In addition, while the cash flow as applied to the benchmark is scaled in this embodiment, it will be understood that a similar effect can be achieved by scaling the cash flow values as applied to the private equity asset. The effect is that of, for example, reducing the value on one side of an equality, or increasing the value on the other.

A preliminary step is to select a suitable comparison asset valued on the benchmark index. There should be sufficient information available about the benchmark index so that the result of applying the cash flow to the benchmark investment asset can be determined. Preferably, the comparison benchmark asset is well understood by market participants and has readily available properties such as performance, volatility, correlations etc. This is usually the case for indices of public market assets, both equity and debt. For benchmarking of US private equity, the S&P 500 total returns index is a suitable candidate. However, depending on the type of private equity and the comparison that is to be made, different indices can also be used, such as an index based the NASDAQ, an index representing an investment in or based on a risk free interest rate, an exchange rate, or other market factor or attribute of interest. In addition, multi-dimensional benchmarks can be used wherein several indices are provided, and combined or blended if needed, and the value of the benchmark investment determined relative to these multiple indices. Or alternatively, the method can be applied to sub-sets of the asset using different benchmarks, for example the S&P500 for the US component and the STOXX 50 for the European component.

The scaling factor can be determined either analytically, using a mathematical equation, or by algorithmic techniques, such as an iterative process. Which technique is used depends in large part on the complexity of the analysis and on whether the scaling is a single linear value or a more complex scaling function. Other considerations will be appreciated by those of skill in the art.

For an analytical determination of scaling in the embodiment where disbursements are scaled so that the final values of the private equity and the benchmark are equal, first the scaling factor $\lambda$ of distributions that need to be divested from the index tracking fund is determined in order to end up with the same exposure as the private equity asset. Then, the scaled distributions are used, for example, to compute the internal rate of return of the benchmark investment.

Figure 5:
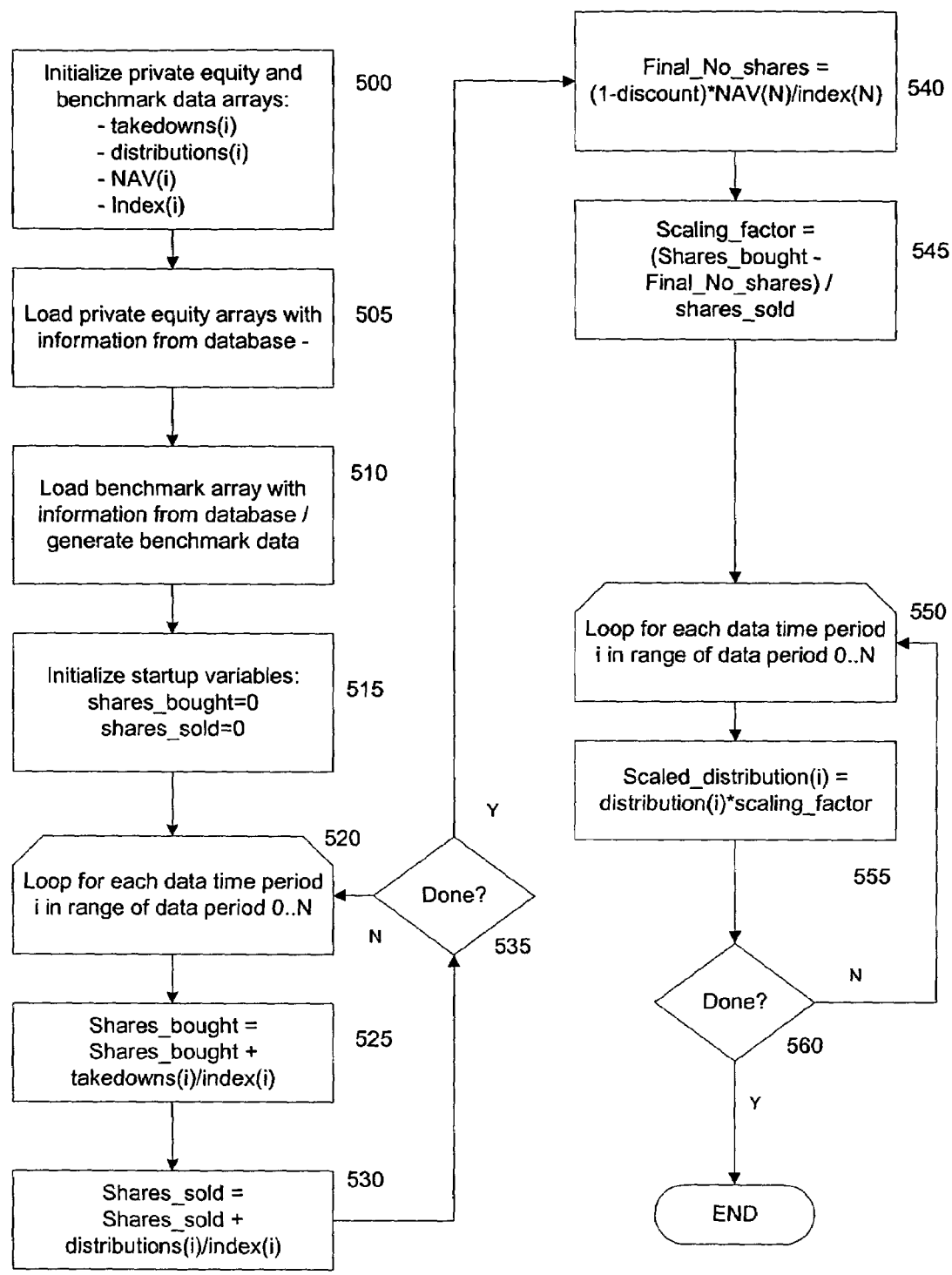
FIG. 5 is a flow chart showing an analytical method for determining a benchmark cash flow scaling factor and preparing a set of scaled private equity cash flow data for use in simulation or as otherwise desired.

FIG. 5 is a flowchart of an algorithm for determining a linear scaling factor in an embodiment where only disbursements are scaled and where the final values of the private equity and benchmark are set equal. Input data includes set of cash flow and benchmark data for time periods i over a range of 0 to N, having takedowns $T_i$, distributions $D_i$ and index values $I_i$ at times i. Initially, suitable private equity and benchmark data arrays are initialized (step 500) and the private equity cash flow data is loaded from a suitable database into the arrays (step 505). The benchmark array is then loaded with benchmark index data (step 510) and startup variables are initialized (step 515). The data can represent actual market data or generated index values, such as may be present during a Monte-Carlo simulation.

The total number of index shares bought ($S_+$) and sold ($S_-$) over time is then determined. These values can be simply the sum of the individual draw downs and distributions divided by the value of the benchmark at the time of the event:

$$S_+ = \Sigma_{i=0,\ldots,N} T_i/I_i \quad \text{(Equ. 1)}$$

$$S_- = \Sigma_{i=0,\ldots,N} D_i/I_i \quad \text{(Equ. 2)}$$

With reference to FIG. 5, this can be determined in a loop that steps through each entry in the cash flow arrays and increments the totals as appropriate. (Steps 520-535).

Requiring the final value of the index tracking fund investment to match the NAV of the private equity fund at the end of the last period results in an equation that can be solved for a scaling factor $\lambda$:

$$S_+ - \lambda S_- = NAV_N/I_N \quad \text{(Equ. 3)}$$

$$\lambda = (S_+ - NAV_N/I_N)/S_- \quad \text{(Equ. 4)}$$

To implement this, a final number of shares that the benchmark investment must have is defined as the NAV of the private equity divided by the index value at the time N: (i.e., Final Number=(1−discount)*$NAV_N$*/$I_N$. (Step 540). The difference between the number of shares bought in the benchmark and the final number that should be in the benchmark for its NAV to equal that of the private equity represents the amount over or under invested and the scaling factor is this difference divided by the total number of shares sold. (Step 545).

Figure 6:
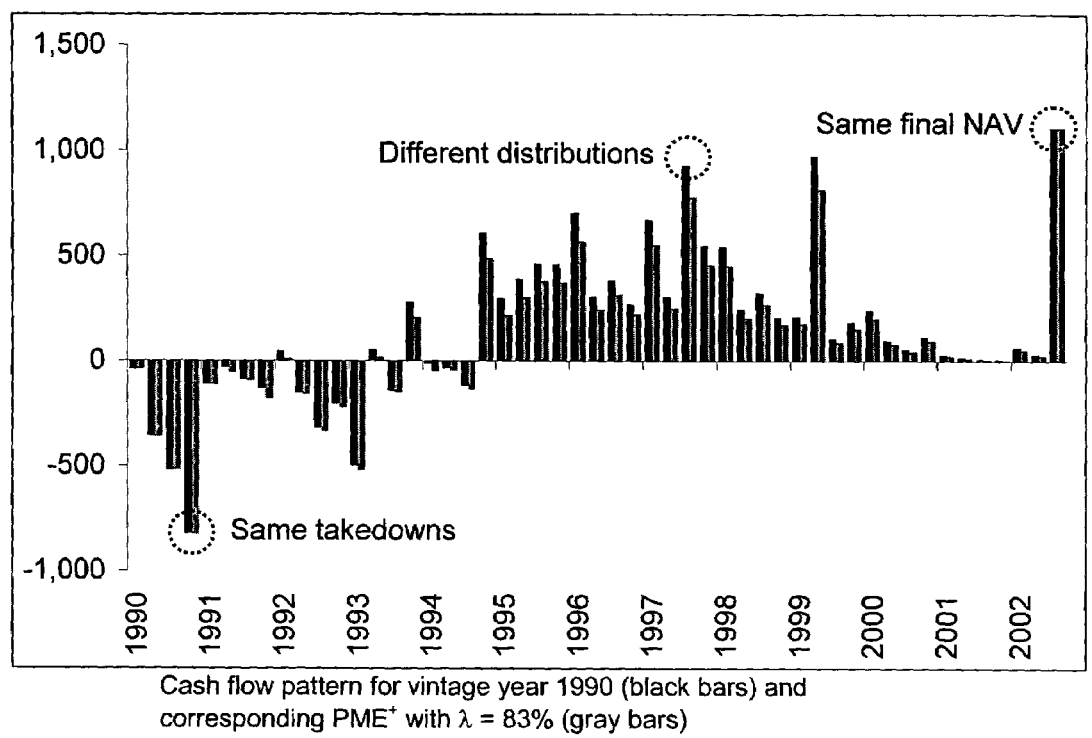
FIG. 6 is a graph of a cash flow pattern for the entire vintage year 1990 and the corresponding cash flows obtained with the S&P500 total return index according to a method of the invention.

Once a scaling factor $\lambda$ is determined, a set of rescaled distributions can be generated (steps 550-560). The IRR of the benchmark (PME+) can be computed and the scaled distribution data used for other purposes as appropriate. For example, applying this technique to the cash flow pattern for a large group of funds for the vintage year 1990 and benchmarking the cash flows against the S&P500 total return index resulted in a determination of the scaling factor $\lambda$ of about 83. The results of this analysis are shown in the chart of FIG. 6. A scaling factor of less than 1 indicates that the private equity portfolio outperformed the benchmark index. In this example, the IRR of the two cash flow patterns represented in the figure are respectively 22.1% for private equity and 16.4% for the public benchmark.

This methodology is particularly appropriate for funds with a majority of realized investments, where the impact of final NAV on the benchmark is limited. This impact can be evaluated by setting a 100% discount on NAV in the benchmarking process, which for the above example actually yields 17.6% IRR instead of 16.4% for the public benchmark, indicating limited NAV dependency. Alternatively, using NAV discounted at secondary market level is a simple way of adapting the methodology for younger partnerships with larger proportion of unrealized investments. Thus, for example, the value of the NAV used to determine a scaling factor can be multiplied by a constant factor K, where K=(1−discount) or K=(1+premium) to adjust the NAV with consideration of market, investor, or advisor.

Figure 9:
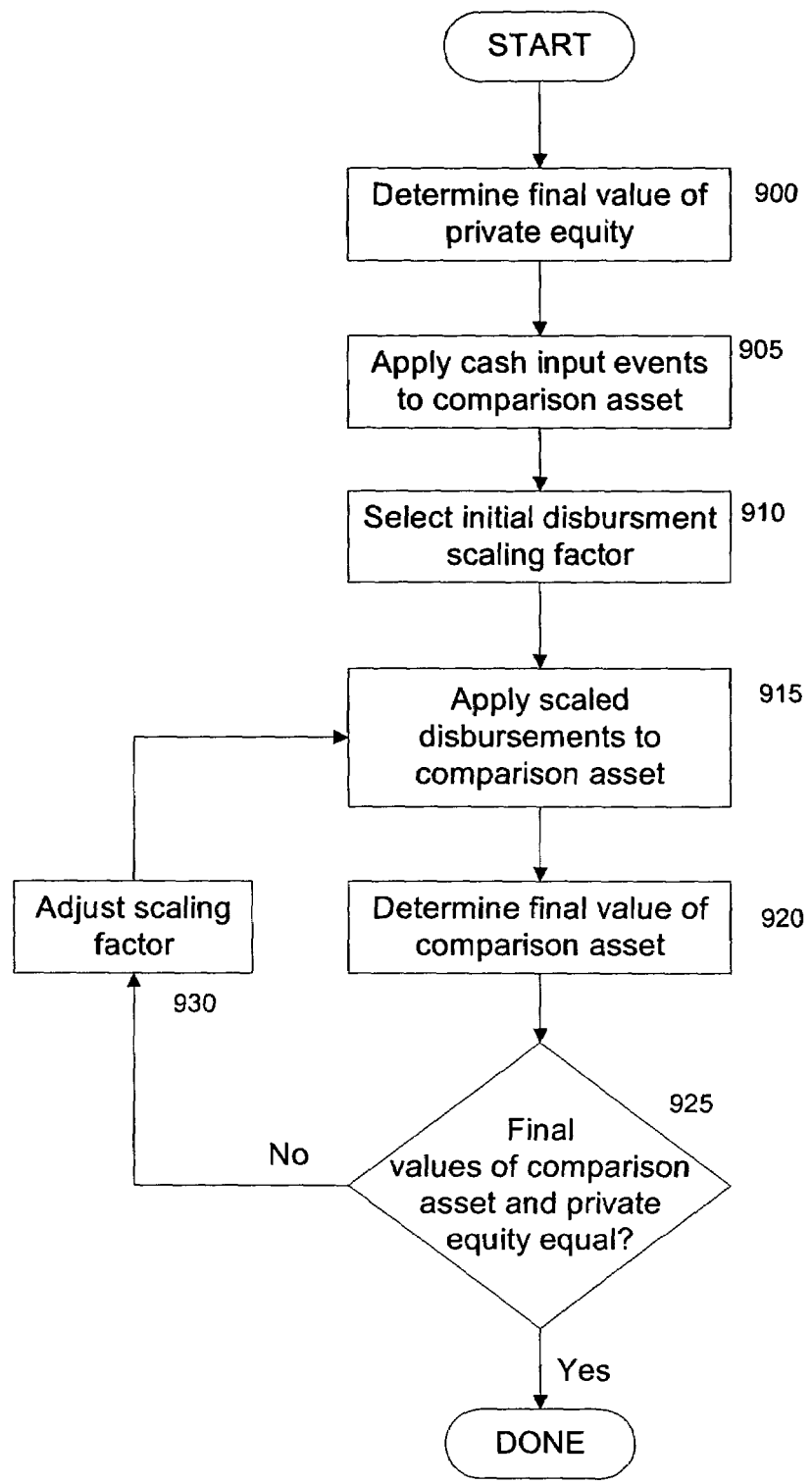
FIG. 9 is a flow chart showing an iterative method for determining a cash flow scaling factor.

As the complexity of the scaling factor or scaling function increases, it may not be possible to determine the scaling factor or scaling function using a single equation, such as Equ. 4, above. In an alternative embodiment, the scaling factor or function can be determined using an iterative process. FIG. 9 is a simplified flow chart showing one iterative method. The order of the steps shown in this (and other flow charts) is only for purposes of example and can be adjusted as appropriate as will be appreciated by those of ordinary skill in the art.

With reference to FIG. 9, the final value or other performance measure of the private equity asset is determined or retrieved from a database, as suitable (step 900). The disbursements are applied to the benchmark comparison asset (step 905). An initial scaling factor or function is selected (step 910), perhaps using an analytically derived equation that is relatively accurate, and scaled disbursements are applied to the benchmark (step 915). The performance attribute of the benchmark investment, such as its final value is then determined (step 920) and compared with the corresponding performance attribute of the private equity asset (step 925). If the relationship between the two values do not meet the target condition, such as being equal, the scaling factor or function is adjusted accordingly (step 930) and the process repeated until the target condition is met. In the example described here, the scaling factor is a constant and is applied only to the disbursements and the target condition is equality for the final values of the private equity asset and the benchmark investment. In this embodiment, the final value of the scaling factor provides a measure of the relative performance of the investment in the private equity asset to a hypothetical investment in the comparison asset with the same timing as the private equity asset and with the same cash inflows and a proportional outflows. Alternatively, and as noted above, the scaling factor can be applied to the cash investments, instead of the disbursements. More complex variations using scaling for both cash-in and cash-out flows, can also be implemented.

Analogous to scaling of the cash flows discussed above, the scaling technique can be used to scale the index to a set of cash flows wherein the characteristics for the scaled benchmark index can be used as the ones for the private equity. For example, the IRR for the entire private equity market (pooled cash flows) from 1980 to 2002 is about 15.7%, whereas the S&P500 PME is around 13.7% IRR. By scaling the S&P500 returns linearly, one can increase the PME IRR up to 15.7%, and then use the characteristics of the scaled index as the ones for private equity. Hence, over the period 1980-2001, the S&P500 average return and volatility were 14.8% and 15.5% respectively. Over the same period, the scaled index with same IRR as private equity is showing 17.0% and 18.3% respectively.

The benchmarking process described above is useful when there is performance data for the private equity asset in question. However, because the historical record of reliable performance data for private equities only spans about 20 years, it is difficult to accurately evaluate or simulate the performance of a private equity asset under market conditions that did not occur during this time period. Thus, for example, because the last 20 years were characterized by exceptional performance, it would not be wise to base future expectations directly on data that was collected during this time period. This is of particular concern for financial institutions that must perform a "value at risk" or rating analyses for the private equity.

Value at risk indicates the greatest possible loss that the institution may expect for an investment in the private equity with a certain degree of probability during a specified period of time. Financial simulation tools will typically generate a large number of "runs" of performance or market data, using, e.g., Monte-Carlo, historic, or parametric analysis techniques or combinations of the above. For each run, the performance of the private equity at issue is determined. The collection of results can be used to determine, for example, the percent likelihood that a loss in value of the investment will exceed the value at risk. Similarly, in a rating analysis, the performance of the private equity is simulated to determine the probability that the financial structure being analyzed will be unable to meet its expected payment obligations, or other benchmarks used to rate the security. As will be appreciated, in order to get accurate simulation results, the performance of the private equity must be analyzed under a wide . . . variety of market conditions. Due to the lack of historical performance data, this can be difficult or impossible for assets such as private equity.

According to a further aspect of the invention, cash flow scaling is used to generate cash flow data from the existing data set for use in analyzing the performance of private equities during periods for which historic data for that equity are unavailable for use relative to generated index values used. Although the cash flow data is scaled to achieve a general relationship with the benchmark (during the period in which real cash flow data for the private equity is not available), the general timing and relative magnitudes, and to some extent the autocorrelation, of the cash flows are preserved.

The scaling value applied to the cash flow data can be selected to provide a predetermined relationship between the behavior of private equity relative to the benchmark. For example, an assumption can be made that, on average, private equity will always perform the same as the benchmark or will out- or under-perform the benchmark by a specified amount. Alternatively, the performance attribute of private equity relative to the benchmark index can be determined for the period of time X for which both data sets (i.e., private equity and benchmark) are valid. The private equity cash flow data can then be scaled to reproduce this relationship relative to the same (or analogous) benchmark at a different time period Y.

The specific index used is selected according to the aspect of the private equity asset being measured or simulated. Care should be taken to ensure that, at least for the attribute(s) of interest, the behavior of the selected index serves as a good proxy with respect to the behavior of private equity within an appropriate measure of error for the time period over which good data is available for both the index and private equity. Specific attributes that can be used to determine whether an index is a good proxy depend on what is being modeled and can include correlation, total multiples, and volatility.

In reality, there will almost always be at least a small mismatch between the benchmark used for the proxy investment and private equity. In such a case, the benchmark and/or the private equity data can be adjusted during simulation to provide a closer match and the amount of the mismatch can be used, for example, to provide a range within which the cash flow data or scaling factor can be randomly varied during simulation.

In addition, particularly for historic simulation, there may be circumstances where the same benchmark is not available for both time periods X and Y. If reference to historical benchmark data is desired, other indices can be selected, and combined if appropriate, to generate an index that is expected to have characteristics sufficiently similar to those being measured. For example, NASDAQ index data is not available prior to the 1970s. Accordingly, if the NASDAQ were selected as a behavior proxy of the private equity performance from 1985-2000, and simulation was to be performed during a time period of 1930-1945, available index data from this earlier time period could be selected and combined to produce index data that is expected to behave analogously to the NASDAQ index, had it been determined for that period.

The generation of scaled cash flow data can be done in a variety of ways. In one embodiment, the performance of the private equity during time Y is presumed to be the same as the benchmark index. The appropriate scaling factor to apply to the cash flow data can then be determined using analytic or algorithmic techniques similar to that for benchmarking, discussed above. As discussed above with respect to benchmarking, the specific technique used depends on whether a scaling factor is selected or a more complex scaling function is used and also on the specific attribute being modeled, as will be appreciated by those skilled in the art.

In a first implementation, where private equity and benchmark investments have the same value at the end of the analysis period, cash flow data from time X can be applied to a hypothetical investment that has a performance measured using the index data from time Y. The number of shares bought and sold in the benchmark investment is determined, and the actual number of shares needed to equate performance with the private equity is also determined. This data is used to determine a scaling factor according to, e.g., Equ. 4. (Examples of this and other implementations are given below)

Figure 10:
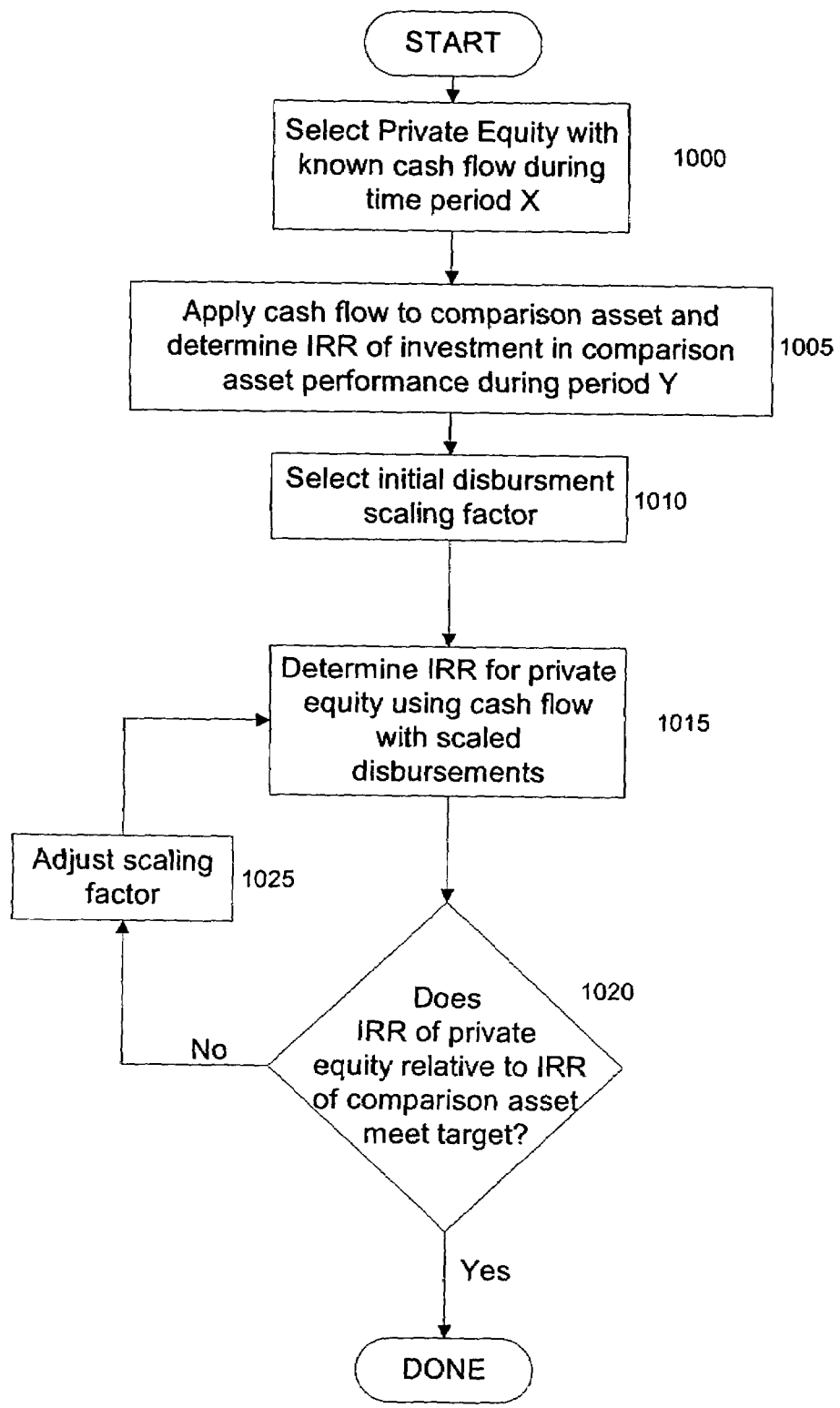
FIG. 10 is a flow chart showing an alternative iterative method for determining a scaling factor.

In an alternative implementation, the scaling factor or function can be determined iteratively. A simplified flowchart showing one iterative method of determining a scaling factor is shown in FIG. 10. Initially, a known cash flow for a private equity during a period of time X is selected (step 1000). The cash flow is applied to a benchmark comparison asset and the value of the index during time Y is used to determine the performance of the benchmark investment, such as by its IRR. (Step 1005). An initial scaling factor is selected and used to generate a scaled cash flow for use during time Y. (Step 1010). Preferably, only the disbursement components of the cash flow are scaled. The IRR for the scaled cash flow is then determined (step 1015) and compared to the IRR of the benchmark. (Step 1020). If the relationship between the IRR for the scaled private equity cash flow and the IRR for the cash flow as applied to the index does not meet the target, here equal values, the scaling factor is adjusted (step 1025) and the process repeated. Other target relationships could alternatively be used. The resulting scaling factor can then be used to link the known cash flow from a private equity during time X to a scaled cash flow data set suitable for use in a performance analysis of a private equity during time Y.

In this embodiment, the target relationship between the private equity and public performance that is set by selecting an appropriate scaling factor is predefined (i.e., the final values are always equal). However, it is also possible to determine the desired relationship as part of the process. Thus, for example, an initial analysis can be performed between the private equity and the benchmark index during a period X for which both types of data are available to determine the relationship between private equity relative to the benchmark in this time frame. This analysis can be, for example, a benchmarking analysis using scaled cash flow data as disclosed herein, or other types of analysis known to those of skill in the art. Once the relationship between private equity and the benchmark is determined, that same relationship can be used as the target for setting the scaling factor relative to index data for a different time period Y.

In a particular embodiment, the scaling factor can be used to adjust the private equity distributions until the private equity IRR reaches the IRR of the comparison asset. As a variation, the private equity distributions can be scaled until the private equity IRR and its PME+ (for the comparison asset) are the same. In practice, the scaling factors using these two targets are very close to each other and the difference in value is largely immaterial. For example, an analysis using actual US private equity data from 1980 through 2002 showed a private equity with an IRR of 15.7% and its S&P 500 PME of 13.7%. Scaling private equity distributions down until private equity IRR reaches 13.7% results in a scaling factor of 0.9305. Scaling private equity distributions down until private equity IRR and PME of the original private equity cash flows are the same, in this case 13.4%, results in a scaling factor of 0.9380.

Depending on the implementation and the issues being considered, private equity cash flows can also be linked to beta, a measure of the linear relationship between the returns of an index and the returns of a specific asset. In one embodiment, by way of example, a private equity asset class is characterized by pooled cash flows for all vintages and the benchmark index is the S&P500 total return index. First, the S&P500 returns are rescaled by multiplying the returns by beta and then recomputing a scaled index. Next, all private equity distributions are rescaled linearly up/down so that scaled private equity IRR equals PME of the (beta) scaled index. The result provides a map of the relationship between beta and the cash flow scaling factor. This factor can, for example, account for the return difference in the various industries in which a particular private equity asset is invested. The factor can also be used to account for the effect of leverage in the asset being analyzed.

Although use of a constant scaling factor $\lambda$ for a linear scaling has been primarily discussed herein, a more complex scaling function can alternatively be used to scale the distributions. This approach is beneficial when more complex cash flow behaviors are to be captured. The scaling can be linear, piece-wise linear, or based on any function of one or more variables. The scaling function should have one or more attributes that can be adjusted so that the degree of scaling provided by the scaling function can be changed during the calibration process to provide a scaled cash flow that meets the specified criteria. For example, the scaling function can be dependent on the age of the fund, i.e., as represented by an index i to a time-series array of cash flow events. A myriad of other factors could also be introduced into a scaling function depending on what was being modeled. Such other factors include scaling variations that are dependent on the private equity's size, geography, relative magnitude of specific distributions, associated industry, currency, and even aspects such as a quantification of the reliability of the private equity manager. The limit of suitable factors is dependent largely on the types of information which are expected to be available for the private equities under analysis.

Figure 7:
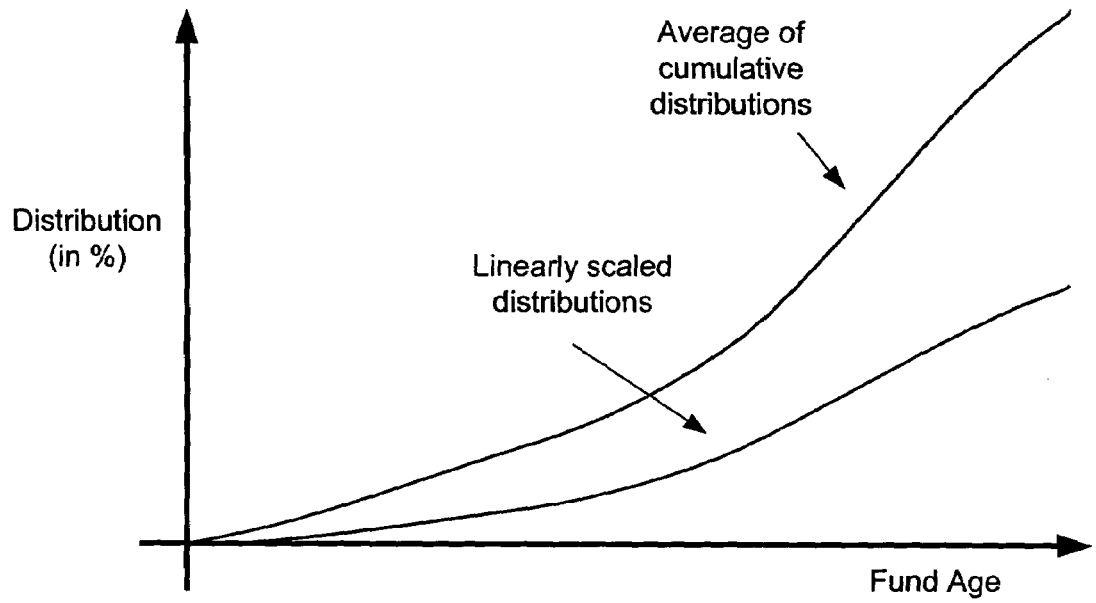
FIG. 7 is a graph showing an average distribution curve and a linearly scaled distribution.
Figure 8:
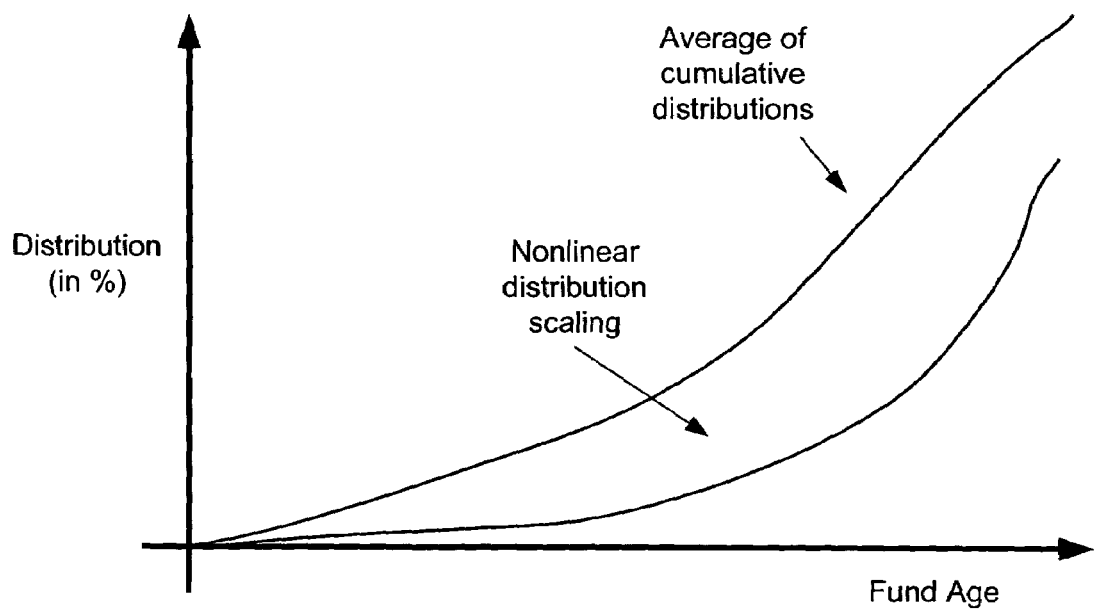
FIG. 8 is a graph showing an average distribution curve and a non-linearly scaled distribution.

FIG. 7 is a graph showing a representative curve of the average distribution (in percent) made by a set of funds over the fund lifetime. Linearly scaling of the disbursements results in scaling the entire curve. Thus, a scaling factor of $\lambda=0.5$ would reduce the average distributions across the lifespan of the funds by half, as shown. However, there may be circumstances where a non-linear scaling would allow analysis of specific effects, such as changing the payout schedules due to market conditions that may cause a fund to delay disbursements. A simple scaling function of this type is one where the disbursements are multiplied by an increasing function such as a quadratic or other exponential function. An example scaling function of this type is $D_i$ [scaled]$=A*i^2 D_i$, where A is a constant and i is the index representing the time from origination of the disbursement. The $i^2$ term yields a larger weight for the late disbursements and hence has the effect of pushing distributions out towards the end of the term. The value of A can be solved for mathematically or determined through an iterative process as discussed above so that the scaling function will produce a scaled cash flow that meets the specified requirements. Of course, more complex functions, having multiple variables, can also be used.

Figure 14:
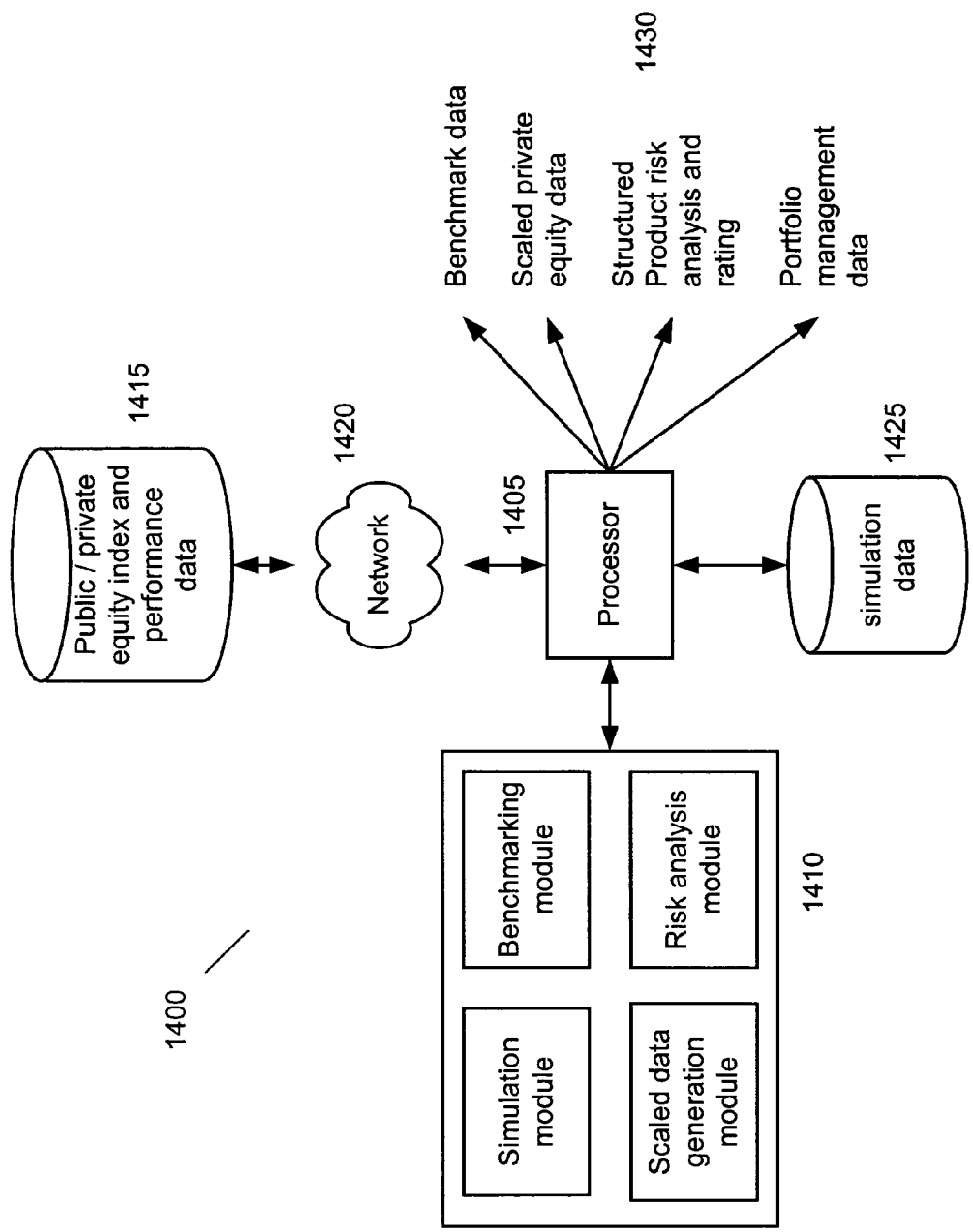
FIG. 14 is a high level diagram of a computer system that can be used to implement the present invention.

As illustrated in FIG. 14, the present invention can be implemented on a computer system that includes one or more computers, such as PCs, terminals, workstations, or other devices. The computer system 1400 has a processor 1405, program memory 1410 containing various program modules, and access to at least one database 1415 containing the performance information for the private equities at issues as well as information for the comparison asset used as a benchmark. For example, the system can have access to the publicly available database of private equity performance as well as a database of historic public stock market index values and other information. The databases can be local or remote to the computer system and connected via a direct line, private network, the Internet, or other communication channel 1420. A local database or index memory 1425 can be provided to store data generated for use in simulation. A variety of outputs 1430 can also be provided as appropriate for the implemented functionality.

The present invention can be implemented using a wide variety of programming techniques and algorithms and can be made available as part of an individual tool or incorporated into a complex program, such as a financial risk analysis system. Specific programming techniques to implement the invention will be known to those of skill in the art.

EXAMPLES OF USE

The following are specific examples of use of various aspects of the inventions. The examples are for reference only and should not be viewed as limiting the invention only to these applications or as the only way in which the invention could be used in any of these applications.

Example 1

Evaluation of a Private Equity Performance Relative to a Benchmark

The cash flow for a private equity asset can be used to determine a scaling factor that can be used to compare performance of the asset with that of a benchmark. The cash flow can be from a single private equity asset or for multiple assets as appropriate, such as the cash flow for the entire asset class of a particular vintage year. For example, the cash flows from Jan. 1, 1990 to Dec. 31, 1999 can be applied to a benchmark fund valued on the S&P 500 Total Returns index. A scaling factor is selected so that the ending values of the private equity investment and the S&P500 total returns benchmark fund are the same. The magnitude of the scaling indicates how well the private equity asset performed relative to a fully diversified portfolio of public securities as represented by the S&P500.

With reference to FIG. 11A, there is shown a simplified set of index data and a corresponding set of private equity cash flow data. As shown, the return on the benchmark index over periods 1-10 increases from 1% to 10%. The private equity being analyzed has a series of 4 draws during the first 4 periods and distributions starting in period two, peaking in period 5 and continuing the duration of the data window. At period 10, the NAV for private equity is 10.0 and the calculated IRR is 17%.

FIG. 11B is a table showing conventional PME analysis using unscaled cash flow data. Using PME, the IRR of the resulting benchmark investment is −0.3%. The resulting negative IRR is particularly troubling and counterintuitive because the index continually increases over the analysis period and, therefore, an actual investment would have produced a positive IRR.

FIG. 11C is a table showing an analysis using a scaled cash flow according to this aspect of the invention. A scaling factor of 71.0% was determined to provide scaled distributions that would in a final NAV of 10 for the benchmark investment, equal to that of the private equity. The benchmark IRR was determined to be 5.1%. Because the scaling factor is less than 1, the private equity can be viewed as having outperformed the index, as the index investment has returned 29% less cash over that period.

Example 2

Performance Comparison of Multiple Private Equities

The evaluation of a single private equity (or aggregate of private equities), as discussed above, can be performed separately for different private equities relative to the same index. The scaling factors determined for each private equity set can then be compared to each other. The difference between the scaling factors provides an indication of how well each of the equities performed relative to the pubic index and thereby how well they performed relative to each other. Advantageously, this allows the relative performance of the different private equities to be compared even if the timing of the cash flow events are different. This technique provides an alternative for the conventional technique of directly comparing IRRs of the private equities.

Example 3

Generation of Scaled Private Equity Data for Use, e.g., During Analysis Under Market Conditions for which Private Equity Performance Data is not Available Private equity performance data representing individual or pooled cash flows can be scaled to allow mapping of the data to a stream of public equity performance data, as represented by an index, for which actual private equity performance data is not available. The known private equity cash flow is applied to the public equity performance data and the cash flow scaled so that the performance or other attribute of the private equity has the desired relationship to the benchmark. The relationship can be predefined, such as where private equity performance is assumed to equal public market performance, or the relationship can be determined by initial analysis, such as by performing a benchmark comparison of the performance of private equity relative to a benchmark for a period where data for both private equity cash flow and the index are available, as discussed in Example 1.

Once the scaling factor has been determined for an aggregate cash flow, it can be used to generate scaled cash flows that are appropriate for the market conditions represented by the index for which the scaling factor was generated. The generated cash flow(s) can then be used to simulate the performance of the private equity relative to a comparison asset for market conditions for which real private equity data is not available or for other purposes.

For example, a scaling factor can be determined using known aggregate cash flow data from 1990-1995 and applying it to a index-based investment having a performance determined using public market data from 1929-1934. To simulate the performance of a specific private equity during 1929-34, the cash flow data from 1990-95 can be scaled according to the determined scaling factor to produce a cash flow that is appropriate for the 1929-34 market conditions. This cash flow can then be used in the simulation process.

A sample simulation is discussed below with respect to FIGS. 12A-D and 13A-B. FIG. 12A is a table of generated index data spanning a period of about 130 years. FIGS. 12B-D are tables showing the cash flow data, in the form of draws, distributions, and NAV, for three private equity funds.

In a typical run in a random simulation, the private equity behavior is modeled for a specified length of time starting at an initial point selected at random. In this example, 1955 was selected at random as the starting point for a 10-year window. This window is shown in bold in FIG. 12A. and the relevant index data is reproduced in the table of FIG. 13A. FIG. 13A also shows the aggregate (market) cash flow data for the three funds. Using the methods disclosed herein, and with a target of the private equity market having an final equal value to the benchmark investment, a scaling factor of 72.3% was calculated. Applying this scaling factor to the distributions for each of the three funds results in scaled cash flow data can be used during simulation. FIG. 13B shows the scaled cash flow that results from applying the scaling factor to the distributions of Fund 1. In practice, the private equity market will include a much larger number of funds.

As will be appreciated, while the market performance of the scaled aggregate cash flow data has the target performance relative to the benchmark, subsets of cash flow data selected from the market set will vary from this target. Thus, selecting a variety of subsets of funds from the market and using different (randomly selected) subsets in each simulation run, large volumes of varying private equity cash flow data can be provided for use during simulation.

The focus of the simulation can be adjusted by selecting the subset composition. For example, if the simulation is modeling a particular portfolio of private equities, the subset can be selected from the available pool to provide a random portfolio having a mix of private equities that corresponds to the mix of the portfolio being analyzed. Similarly, subsets can be selected so that they include private equities that have only certain characteristics, like being in certain industry groups, geographic locations, etc. By varying the guidelines used to (randomly) select the subsets used in simulation, the specific performance risk used during modeling can be adjusted.

If further variations are desired during simulation, the process can be repeated using index data that is adjusted, e.g., by some random variation. Similarly, if the target criteria for selecting the scaling factor has a range of variability (i.e., the private equity market will outperforms the public market by 5%±2%), the scaling factor can be varied (perhaps randomly) during the simulation within a range that reflects this variability. The amount of variation introduced in the analysis is dependant on the purpose of the simulation and the available computing capacity, among other factors. Other ways of introducing variation during simulation can also be used.

Example 4

Risk analysis and rating of Structured Products Investing in Private Equities

With reference to the simulation discussed above, by simulating a large number of runs, covering market conditions for which real data is available, as well as market conditions for which scaled private equity cash flow data is, a statistical analysis of the simulation results can be performed to determine a range of possible performance scenarios and a probability of occurrence. There are wide variety of simulation techniques that can be used and which will be known to those of skill in the art.

When a new structured product investing in private equity is developed, it is often desired to have a financial rating agency, such as Moody's or S&P, issue a rating that gives a measure of the risk associated of investing in the structure. This will conventionally be a ranking or grade that reflects the likelihood that the portfolio will be able to meet its payment obligations over a period of time, typically the expected lifetime of the structured product. The present invention allows this rating to be determined with the use of simulation tools and scaled private equity cash flow data as discussed in Example 3.

The rating agency is generally given a description of the financial structure of the private equity structured product which includes specific repayment obligations, terms and conditions of liability, and other details on how it will pay its debts, make distributions, etc. (generally termed a "waterfall" or "watershed" structure). The product can be classified or categorized relative to other products of various types so that the behavior of the structured product can be simulated with reference to existing cash flow data from similar products. A scaling factor is determined for the cash flow data relative to an appropriate benchmark. For a conservative analysis, the scaling factor can be selected to be at or below a target of private equity performance being equal to that of the index.

Then, scaled cash flows (selected from the set of similar underlying investments in private equity) are used to generate a large number of simulation runs. Data from each run is used in conjunction with the structure of the structured product being rated to determine (perhaps with reference to other factors) whether, under the conditions of a given run, the equity would be able to meet its payment obligations. The overall results can then be statistically analyzed to determine the percentage of simulation runs that resulted in a default. This provides a measure of the probability of default which can be used to provide a rating. A variation of this analysis can be used by parties structuring the payment schedules of a private equity, perhaps in conjunction with a rating agency, to determine the effect of different draw down and payment structures on the simulated performance of the equity. By running simulations using different structures, the timing and quantity of draw downs, disbursements, and other payment obligations can be adjusted to balance the likelihood of default in the simulated performance profile relative to the benchmark. Thus, for example, the scaled cash flow simulation can be performed on three proposed structures and the results used to determine which provides the best balance of risk and return and the effect of varying different payment obligation timing and magnitudes.

An alternative method for performing a risk analysis is to conduct a statistical study of the relationship between private equity IRR and PME+ so as to derive a relationship between the risk and return of private equity with the benchmark class.

In addition, after the initial rating process is complete and the structured product is rated and closed, the risk analysis model can be rerun from time to time against the structured product to monitor the risk. This risk monitoring or surveillance can provide useful information for a rating agency or other market groups, such as when the risk for a structured product has changed significantly from the initial risk.

Example 5

A Private Equity Management and Portfolio Allocation Tool

The present invention also enables a wide variety of other types of risk and performance analysis to be done, for example, to determine worst case risk analysis scenarios or for use in a value at risk determination. Other applications include determining how likely one private equity is to outperform a benchmark or another private equity.

In a particular example, the present invention can be used by an investment manager to predict future cash flow from an existing private equity portfolio. More specifically, an investment manager may need to commit to investing a certain amount of money over a future number of years and want to fund this commitment with expected income from a portfolio that includes private equities. By performing a simulation using scaled cash flow data, the disbursements from the simulation can be analyzed to produce a probability disbursement curve indicating the most likely timing and magnitude of distributions and associated error bars. Further analysis can provide a curve indicating a minimum predicted disbursement quantity and timing for which is exceeded by, e.g., 95% of the simulation scenarios. This information can then be used by the investment manager to determine how much expected income from private equity can be safely committed to future investments. The information can also be used to determine a value at risk to aid in determining an amount of cash reserve that should be set aside to provide, for example, a 99% certainty of being able to meet such a commitment of funds.

Other types of analysis can also be performed. For example, a variety of scenarios can be run, as described above, and the differences in output can be analyzed to determine how the portfolio can be improved, either by making new investments or rebalancing the portfolio.

The invention has been described above in terms of its preferred implementation and embodiments. However, various changes in the form and details can be made without departing from the spirit and scope of the invention. For example, while the invention has been discussed largely in terms of private equity analysis, the disclosed methodology can also be applied to other types of investments that have similar irregular cash flows.

The invention claimed is:

1. A method for benchmarking relative to an index a performance of a financial product having an irregular cash flow, said being method implemented with a computer system comprising one or more computer processors, the method comprising the steps of:

receiving using at least one of said computer processors first cash flow data for the financial product over a period of time, the data including at least one input event and at least one output event;

receiving using at least one of said computer processors values for the index over the period of time;

determining using at least one of said computer processors a performance characteristic of the financial product;

determining using at least one of said computer processors a value of a scaling function, wherein a performance characteristic of an investment of a second cash flow in shares valued relative to the index during the period of time has a specified relationship to the performance characteristic of the financial product, the second cash flow corresponding to the first cash flow modified by the scaling function;

the determined value of the scaling function providing a measure of the performance of the financial product relative to the index.

2. The method of claim 1, wherein the financial product is selected from the group consisting of an investment in a private company, a fund of company investments, a fund of funds, hedge funds, insurance liabilities, insurance claims, natural resources, energy investments, or derivatives thereof.

3. The method of claim 1, wherein the financial product comprises a combination of a plurality of financial products.

4. The method of claim 1, wherein the financial product comprises private equity, cash flow input events comprise draw downs, and cash flow output events comprise disbursements.

5. The method of claim 4, wherein the performance characteristic of the private equity and the performance characteristic of the investment of the second cash flow are respective final values at the end of the period of time.

6. The method of claim 5, wherein the specified relationship is an equality.

7. The method of claim 5, wherein the scaling function is linear.

8. The method of claim 7, wherein the scaling function is applied only to disbursements in the second cash flow.

9. The method of claim 1, wherein the step of determining a value of a scaling function comprises the steps of:
  (a) selecting an initial value of the scaling function;
  (b) determining a performance characteristic of an investment of the first cash flow scaled by the scaling function in shares valued relative to the index during the period of time;
  (c) comparing the performance characteristic of the investment with the performance characteristic of the at least one financial product;
  (d) if the comparison does not have the specified relationship, adjusting the value of the scaling function; and
  (e) repeating steps (b)-(d) until the specified relationship is achieved.

10. The method of claim 1, further comprising the step of outputting a benchmark value based upon the determined value of the scaling function.

11. The method of claim 1, wherein the performance characteristic is one of IRR and NAV.

12. A method for benchmarking relative to an investment index the performance of a financial product having an irregular cash flow, said being method implemented with a computer system comprising one or more computer processors, said method comprising the steps of:
  receiving using at least one of said computer processors data representing a cash flow of the financial product for a period of time;
  receiving using at least one of said computer processors values of the index for the period of time;
  determining using at least one of said computer processors a value of an asymmetric scaling function wherein a first performance characteristic of the financial product during the period of time and with a first cash flow has a specified relationship to a second performance characteristic of an investment of a second cash flow in shares valued relative to the index during the period of time; one of the first and second cash flows corresponding to the received cash flow of the financial product and the other of the first and second cash flows corresponding to an asymmetrically scaled version of the cash flow of the financial product in accordance with the scaling function; and
  outputting using at least one of said computer processors an indication of the determined value;
  the determined value of the scaling function providing a measure of the performance of the financial product relative to the index during the time period.

13. The method of claim 12, wherein:
  the cash flow comprises at least one cash input event and at least one cash output event; and
  the asymmetric scaling function comprises a multiplier applied only to one of cash output events or cash input events.

14. The method of claim 12, wherein the first cash flow is the cash flow of the financial product and the second cash flow is the asymmetrically scaled version of the cash flow of the financial product in accordance with the scaling function.

15. The method of claim 14, wherein the specified relationship comprises equal final values at the end of the time period.

16. The method of claim 12, wherein the financial product comprises a private equity asset.

17. A method for analyzing a performance of at least one asset having an irregular cash flow, said being method implemented with a computer system comprising one or more computer processors, the method comprising the steps of:
  receiving using at least one of said computer processors first cash flow data for the at least one asset over at least a first period of time;
  receiving using at least one of said computer processors values for an index over a second period of time, wherein said second period of time is equal to one of: said first period of time or a different period of time;
  determining in a computer using at least one of said computer processors at least one of:
    i. a scaling function, wherein a performance characteristic of an investment of a second cash flow in shares valued relative to the index during the second period of time has a specified relationship to the performance characteristic of the asset, the second cash flow corresponding to the first cash flow modified by the scaling function;
    ii. a scaling function, wherein said first cash flow data is for a plurality of assets, and wherein a first performance value of aggregate cash flow from the first time period for the plurality of assets modified by the scaling function has a specified relationship with a corresponding second performance value of the aggregate cash flow from the first time period as invested in shares valued relative to the index during the second time period;
  and, based on the determined scaling function, the method further comprising at least one of the following steps:
    a) providing in said computer using at least one of said computer processors a measure of the performance of the asset relative to the index;
    b) generating in said computer using at least one of said computer processors scaled cash flow data using the scaling function on at least a portion of the cash flow and providing the scaled cash flow data as input to a financial analysis system;

c) simulating in said computer using at least one of said computer processors behavior of the at least one specific asset during the second time period;

d) generating in said computer using at least one of said computer processors a plurality of simulated cash flows for a plurality of selected sets of assets and a plurality of second time periods and analyzing the simulated cash flows to determine at least one of: a future income stream or a probability that a specified asset will be able to meet its determined expected future payment obligations.

\* \* \* \* \*